(12) United States Patent
Fukui

(10) Patent No.: US 6,572,104 B2
(45) Date of Patent: Jun. 3, 2003

(54) SHEET MEMBER HOLDING DEVICE

(75) Inventor: Takashi Fukui, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/917,218

(22) Filed: Jul. 30, 2001

(65) Prior Publication Data

US 2002/0014553 A1 Feb. 7, 2002

(30) Foreign Application Priority Data

| Jul. 28, 2000 | (JP) | .......................... 2000-229252 |
| Oct. 2, 2000 | (JP) | .......................... 2000-301728 |
| Oct. 18, 2000 | (JP) | .......................... 2000-317598 |
| Oct. 18, 2000 | (JP) | .......................... 2000-317599 |
| Oct. 26, 2000 | (JP) | .......................... 2000-326834 |

(51) Int. Cl.$^7$ ............................................... B65H 5/012
(52) U.S. Cl. ................................................... 271/277
(58) Field of Search .................. 271/277, 82; 101/409, 101/410, 415.1, 378; 355/85, 110

(56) References Cited

U.S. PATENT DOCUMENTS

| 4,824,096 A | * | 4/1989 | Fichter et al. ............... 101/410 |
| 5,516,096 A | * | 5/1996 | Whiteside et al. ........... 101/409 |
| 6,003,442 A | * | 12/1999 | Solomon et al. ............. 101/409 |
| 6,164,204 A | * | 12/2000 | Kawada et al. .............. 101/409 |
| 6,260,482 B1 | * | 7/2001 | Halup et al. ................. 101/409 |

* cited by examiner

Primary Examiner—Donald P. Walsh
Assistant Examiner—Kenneth W Bower
(74) Attorney, Agent, or Firm—Sughrue Mion, PLLC

(57) ABSTRACT

When a sheet member or printing plate is closely held on a peripheral surface of a drum, no scratch is made on the peripheral surface, edges of the sheet member are held with certainty, and the sheet member is prevented from being partially lifted from the peripheral surface, thereby preventing deterioration of image quality. Since clamp portions are rotated in a direction in which they tension the sheet member due to a centrifugal force acting thereon, the sheet member is held in close contact with the peripheral surface. Further, since the clamp portions are disposed at one end portion in a width direction of the plate, gripper margins of the sheet member is reduced and an image-recordable area thereof can be increased.

32 Claims, 35 Drawing Sheets

F I G. 6
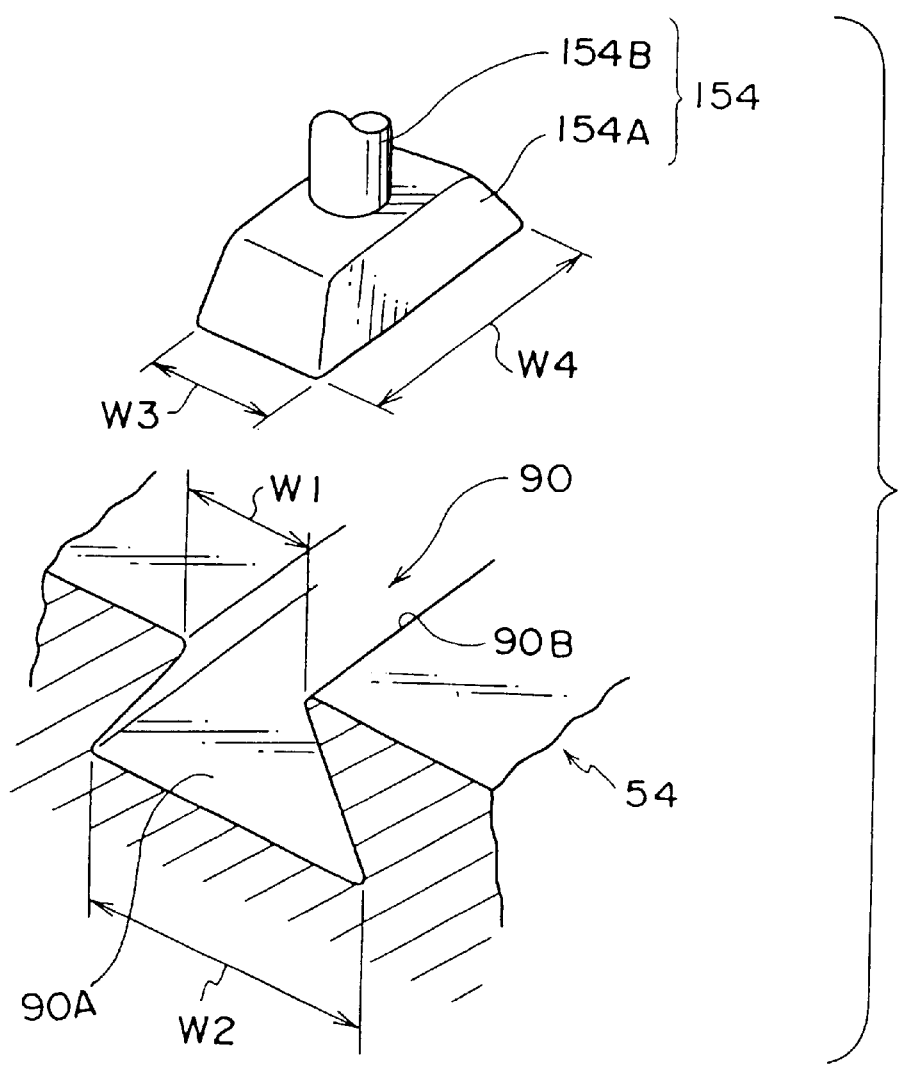

F I G. 1 3
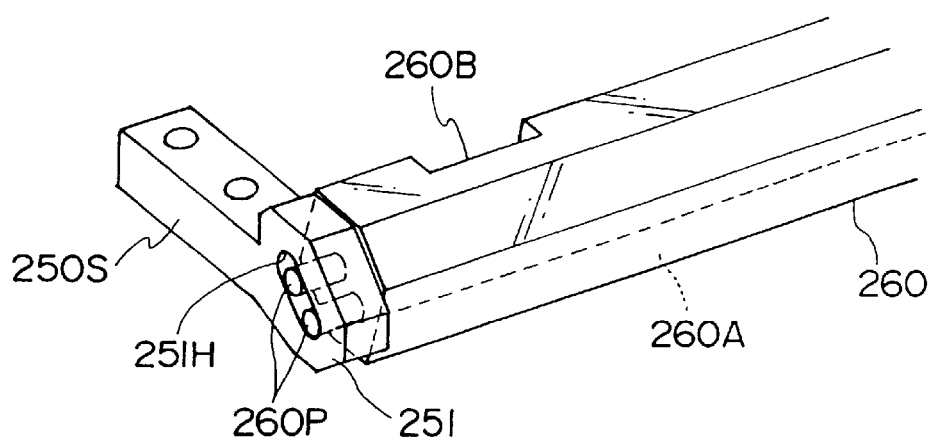

F I G. 1 5
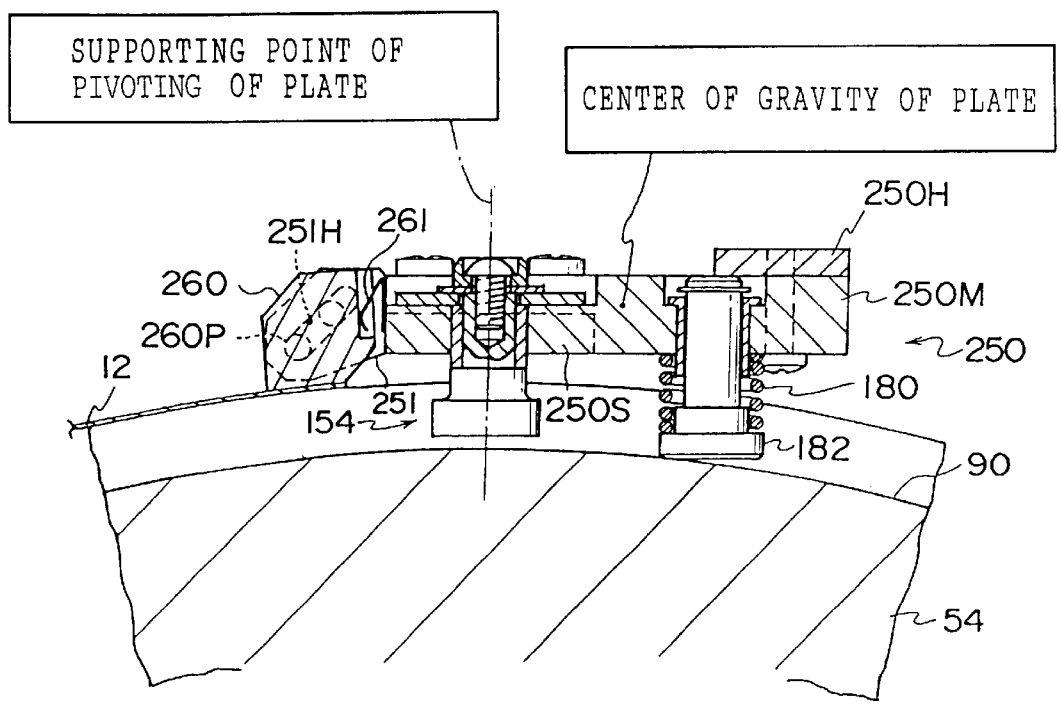

F I G. 1 6
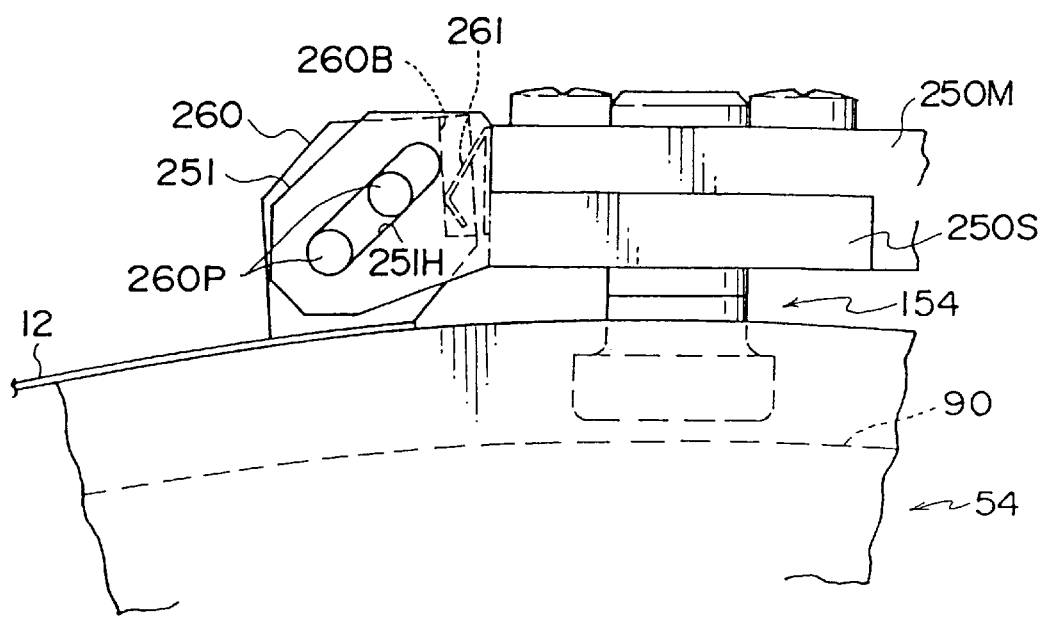

F I G. 2 2
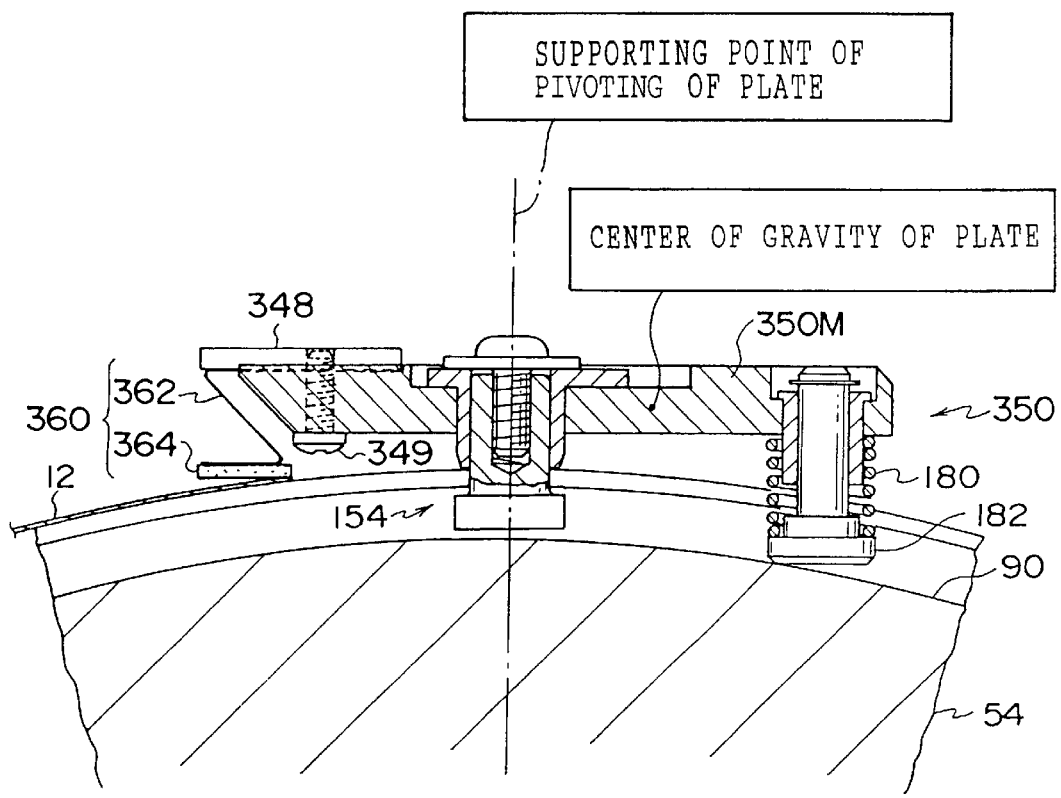

F I G. 2 4
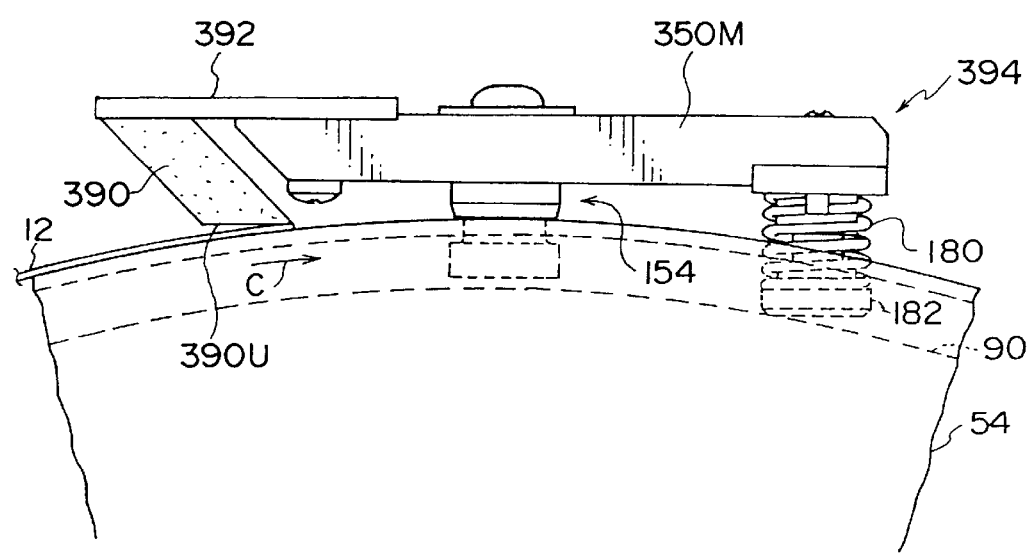

F I G. 2 5
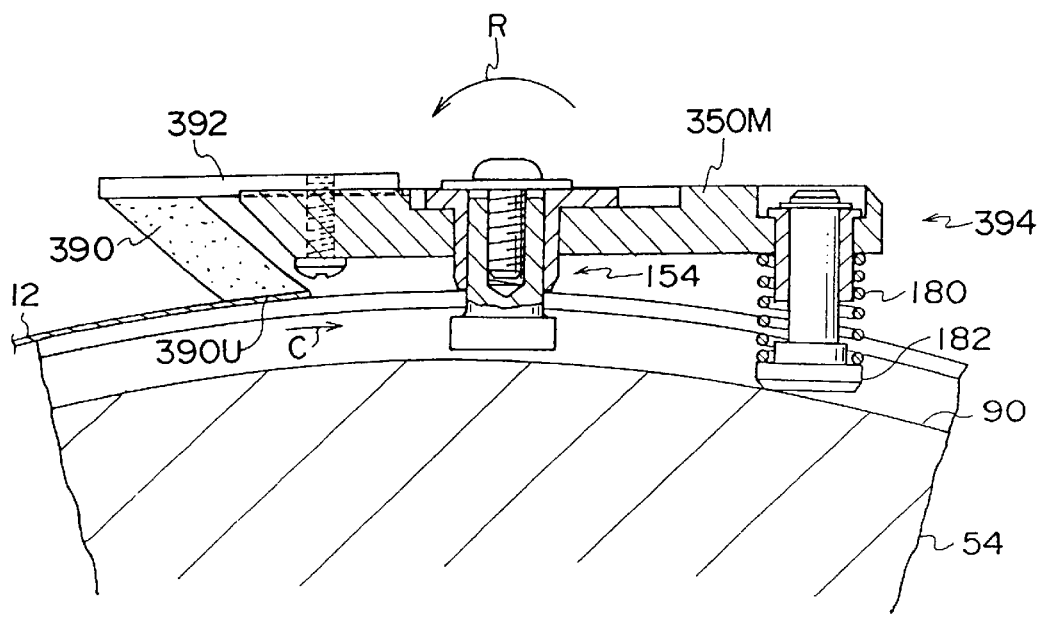

F I G. 2 8
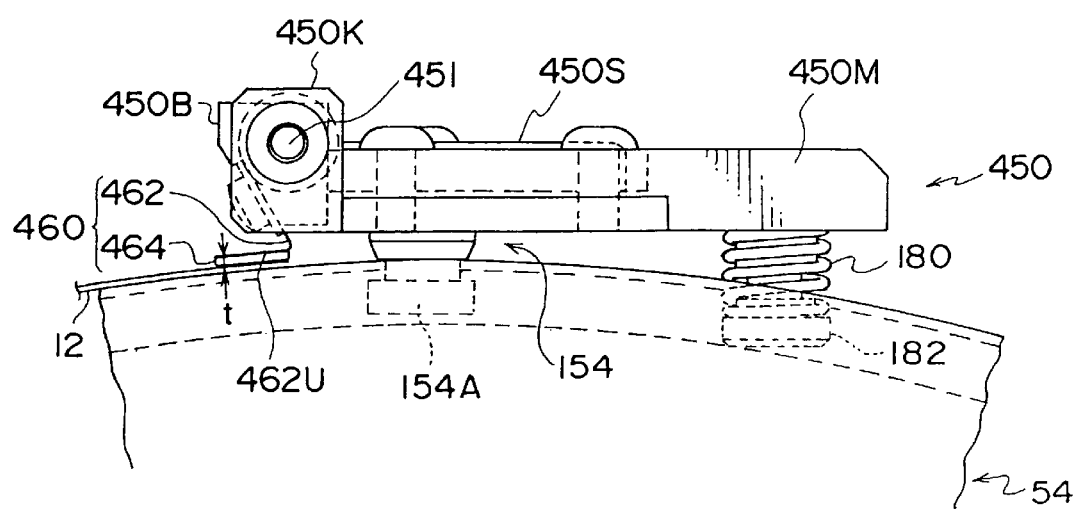

SHEET MEMBER HOLDING DEVICE

BACKGROUND OF THE INVENTION

1. Field of the Invention

The present invention relates to a sheet member holding device for use in a processing apparatus for processing a surface of the sheet member, wherein edges of the sheet member are held in close contact with a peripheral surface of a drum while the drum is axially rotated in a state in which the sheet member is wound around and held on the peripheral surface of the drum.

2. Description of the Related Art

A photosensitive printing plate (hereinafter referred to as a "printing plate") provided with a photosensitive layer formed on a sheet-like support such as a thin aluminum plate is generally used in printing. Printing plates of this type of various sizes having different longitudinal and lateral dimensions are used depending on sizes of printed materials.

In some image exposing apparatuses for performing imagewise exposure onto a printing plate, the printing plate is wound around a rotating drum, and the printing plate is irradiated with light beams according to image data while rotating the printing plate together with the rotating drum to effect scan-expose of the printing plate.

When a printing plate is wound around a rotating drum, opposite edges of the printing plate along a peripheral direction of the rotating drum are nipped and fixed between holding members such as chucks and the rotating drum.

That is, one of the chucks, which corresponds to one of the opposite edges of the printing plate along the peripheral direction of the drum (such as a leading edge in a winding direction) has been previously attached at a predetermined position on the rotating drum, and the other chuck, which corresponds to the other edge of the printing plate (in this case, a trailing edge in the winding direction) is attached at a suitable position depending on the size of the printing plate after the printing plate is wound around the rotating drum.

An exemplary structure of the chuck to be attached to the rotating drum at a suitable position depending on the size of the printing plate is provided with a fixing piece (a supporting post) which can be inserted into any position of an attaching groove formed to extend on the peripheral surface of the rotating drum in the peripheral direction thereof (hereinafter referred to as a "clamp"). The fixing piece attached to the clamp can be moved to any position along the attaching groove, and can nip the edge of the printing plate at a suitable position corresponding to the size of the printing plate.

By the way, when the printing plate which is wound around the rotating drum is exposed, the printing plate is held in close contact with the peripheral surface of the rotating drum, and is rotated at a high speed together with the rotating drum.

At this time, in order to prevent the edge of the printing plate which is fixed by the chuck portion of the clamp from being lifted partially due to a centrifugal force, a member for promoting a nipping force of the chuck portion nipping the printing plate is provided at a position opposite to the printing plate chuck position with respect to the position of the fixing piece. This member is an urging member such as a spring, and the nipping force of the chuck is increased by an urging force of the urging member.

However, in order to provide an urging force between the holding device such as the clamp described above and the rotating drum, the urging member provide to the holding device need to be brought into contact with the peripheral surface of the rotating drum. This may form unevenness on the peripheral surface of the rotating drum due to scratches and the like.

When a printing plate of a different size is brought into close contact at a position at which the unevenness has been formed, the printing plate does not completely contact the surface of the rotating drum at this position because of the unevenness, and therefore, an image recorded on the printing plate by scanning with light beams may be out of focus or deformed, thereby exerting a bad influence upon image quality thereof.

In addition, if the nipping force of the holding member is weak, the printing plate does not closely contact the rotating drum and an image recorded thereon may be out of focus. This is due to firmness of the printing plate, and particularly is caused by the printing plate being shifted in a compressing direction at the edges thereof (nipping positions) in the peripheral direction of the rotating drum.

SUMMARY OF THE INVENTION

In view of the aforementioned, a primary object of the present invention is to provide a sheet member holding device which makes no scratch on a peripheral surface of a drum when holding the sheet member in close contact with the peripheral surface of the drum, holds edges of the sheet member with certainty, and prevents the sheet member from being partially lifted from the peripheral surface of the drum, thereby preventing deterioration of image quality.

In order to solve the above described problem, according to a first aspect of the present invention, there is provided a device for pressing and fixing a sheet member onto a rotating drum around which the sheet member is wound, the device comprising: (a) a support structure including a support which is mounted at a predetermined position on a peripheral surface of the drum; (b) a plate having two end portions, between which the plate is pivotably connected to the drum through the support structure; (c) a clamp element pivotably connected to one of the end portions of the plate, the sheet member being disposed between the clamp element and the peripheral surface; and (d) a resilient element connected to the other of the end portions of the plate, which resilient element is resiliently deformed when the support is mounted to the drum and, by applying a force to the other end portion of the plate, causes the one end portion of the plate to pivot toward the peripheral surface and press the clamp element against the sheet member, thereby resulting in a pressing force against the sheet member.

According to a second aspect of the present invention, there is provided a device for pressing and fixing a sheet member onto a rotating drum around which the sheet member is wound, the device comprising: (a) a support structure including a support which is mounted at a predetermined position on a peripheral surface of the drum; (b) a plate having two end portions, between which the plate is pivotably connected to the drum through the support structure; (c) a clamp element connected to one of the end portions of the plate so as to be translationally movable, the sheet member being disposed between the clamp element and the peripheral surface; and (d) a resilient element connected to the other of the end portions of the plate, which resilient element is resiliently deformed when the support is mounted to the drum and, by applying a force to the other end portion of the plate, causes the one end portion of the plate to pivot toward the peripheral surface and press the clamp element against the sheet member, thereby resulting in a pressing force against the sheet member.

According to a third aspect of the present invention, there is provided a device for pressing and fixing a sheet member onto a rotating drum around which the sheet member is wound, the device comprising: (a) a support structure including a support which is mounted at a predetermined position on a peripheral surface of the drum; (b) a plate having two end portions, between which the plate is pivotably connected to the drum through the support structure; (c) a clamp element attached to one of the end portions of the plate, the clamp element comprising a resiliently deformable portion, and the sheet member being disposed between the clamp element and the peripheral surface; and (d) a resilient element connected to the other of the end portions of the plate, which resilient element is resiliently deformed when the support is mounted to the drum and, by applying a force to the other end portion of the plate, causes the one end portion of the plate to pivot toward the peripheral surface and press the clamp element against the sheet member, thereby resulting in a pressing force against the sheet member.

According to a fourth aspect of the present invention, there is provided a device for pressing and fixing a sheet member onto a rotating drum around which the sheet member is wound, the device comprising: (a) a support structure including a support which is mounted at a predetermined position on a peripheral surface of the drum; (b) a first plate having two end portions, between which the first plate is pivotably connected to the drum through the support structure; (c) a second plate pivotably connected to one of the end portions of the first plate; (d) a clamp element attached to the second plate, the clamp element comprising a resiliently deformable portion, and the sheet member being disposed between the clamp element and the peripheral surface; and (e) a resilient element connected to the other of the end portions of the first plate, which resilient element is resiliently deformed when the support is mounted to the drum and, by applying a force to the other end portion of the first plate, causes the one end portion of the first plate to pivot toward the peripheral surface and press the clamp element against the sheet member, thereby resulting in a pressing force against the sheet member.

According to a fifth aspect of the present invention, there is provided a device for pressing and fixing a sheet member onto a rotating drum around which the sheet member is wound, the device comprising: (a) a support structure including a support which is mounted at a predetermined position on a peripheral surface of the drum; (b) a plate having two end portions, between which the plate is pivotably connected to the drum through the support structure; (c) a clamp element connected to one of the end portions of the plate so as to be translationally movable, the sheet member being disposed between the clamp element and the peripheral surface; (d) a resilient element connected to the other of the end portions of the plate, which resilient element is resiliently deformed when the support is mounted to the drum and, by applying a force to the other end portion of the plate, causes the one end portion of the plate to pivot toward the peripheral surface and press the clamp element against the sheet member, thereby resulting in a pressing force against the sheet member; and (e) a tensioning element provided at least at the other end portion of the plate, which, when the drum rotates, applies a pulling force to the clamp element via the plate due to centrifugal force.

BRIEF DESCRIPTION OF THE DRAWINGS

FIG. 6 is a perspective view showing a dimensional relationship between a groove provided to the rotating drum and a supporting post.

FIG. 13 is a partial perspective view showing that a clamp portion is slidable.

FIG. 15 is a sectional view taken along line 15—15 in FIG. 12 and viewed in a direction of arrows.

FIG. 16 is an enlarged partial view of FIG. 14.

FIG. 22 is a sectional view taken along line 22—22 in FIG. 19 and viewed in a direction of arrows.

FIG. 24 is a sectional view showing a clamp portion in a variation nipping the printing plate on a peripheral surface of the rotating drum.

FIG. 25 is a sectional view showing the clamp portion in the variation being moved in a direction in which it tensions a printing plate by a centrifugal force generated in a plate.

FIG. 28 is a side view taken along line 28—28 in FIG. 26 and viewed in a direction of arrows.

DESCRIPTION OF THE PREFERRED EMBODIMENTS

<<First Embodiment>>

Figure 1:
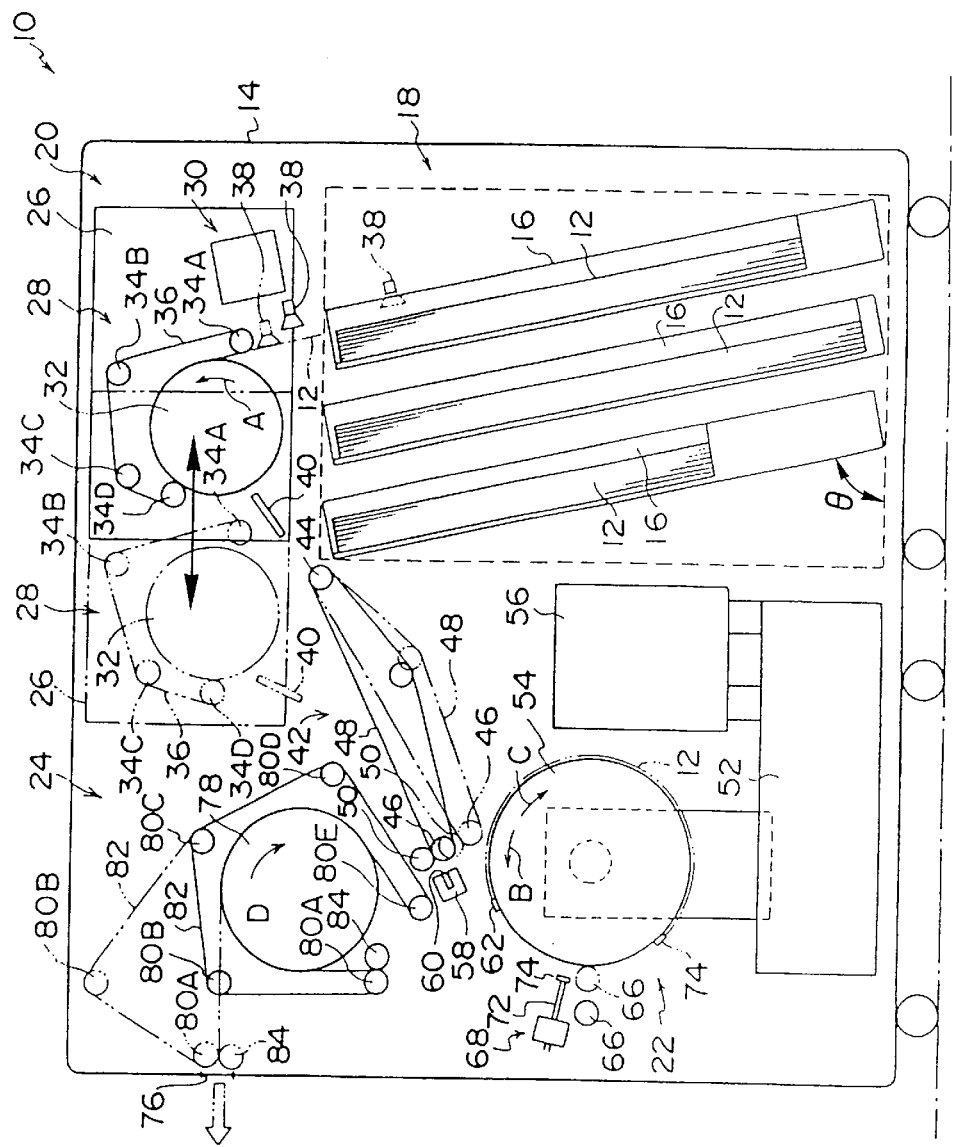
FIG. 1 is a view showing a schematic structure of an image exposing apparatus relating to a first embodiment of the present invention.

A first embodiment of the present invention is described below with reference to FIGS. 1 to 11. FIG. 1 shows a schematic structure of an image exposing apparatus 10 relating to this embodiment. The image exposing apparatus 10 uses a photosensitive planographic printing plate (hereinafter referred to as a "printing plate 12") provided with a photosensitive layer formed on a rectangular thin plate support (having a thickness of, for example, about 0.3 mm) made of aluminum or the like as a sheet member, and irradiating the printing plate 12 with light beams modulated on the basis of image data to scan-expose the printing plate 12. The printing plate 12 which has been exposed imagewize by the image exposing apparatus 10 is subjected to development by an automatic developing apparatus (not shown), and the like.

The image exposing apparatus 10 is provided with a cassette loading section 18, a plate feeding-conveying section 20, a recording section 22, an ejecting buffer section 24, and the like in a machine frame 14 thereof The cassette loading section 18 is disposed at a lower right side of the machine frame 14 shown in FIG. 1, and a plurality of cassettes 16 respectively accommodating a number of printing plates 12 are loaded with being slanted by a predetermined angle θ in the cassette loading section 18.

The image exposing apparatus 10 can process the printing plates 12 of several sizes having different longitudinal and lateral dimensions, and each of the cassettes 16 accommodates the printing plates 12 of one of the different sizes with the photosensitive layers of the printing plates 12 facing up and one end portions thereof being positioned in a predetermined position. The plurality of cassettes 16 are loaded in the cassette loading section 18 so that the cassettes 16 are spaced apart at a predetermined distance and such that the height at one end of each of printing plates 12 accommodated in the cassettes 16 is substantially the same.

The plate feeding-conveying section 20 is disposed above the cassette loading section 18, and the recording section 22 is disposed at a lower central portion of the apparatus, adjacent to the cassette loading section 18. A pair of side plates 26 (only one of them is shown in FIG. 1) are provided at the plate feeding-conveying section 20, and an inverting unit 28 and a sheet feeder unit 30 are attached to the pair of side plates 26.

The inverting unit 28 is provided with an inverting roller 32 having a predetermined outer diameter, and a plurality of small rollers (e.g. four small rollers 34A, 34B 34C and 34D in the present embodiment) are provided around the inverting roller 32. The small rollers 34A through 34D are arranged along a path from the cassette loading section 18 side through a portion above the inverting roller 32 to the recording section 22 side, and an endless conveying belt 36 is trained over then. Thus, the conveying belt 36 is trained over a portion of the inverting roller 32 which spans about a half of the periphery of the inverting roller 32 between the small roller 34A and the small roller 34D.

On the other hand, the sheet feeder unit 30 is provided with a plurality of suction cups 38 which suck upper end portions of the printing plate 12 in the cassette 16. The suction cups 38 are moved downward to face the upper end portions of the printing plate 12 in the cassette 16 loaded in the cassette loading section 18, and suck the printing plate 12. The sheet feeder unit 30 pulls out the printing plate 12 from the cassette 16 by moving the suction cups 38 sucking the printing plate 12 substantially upward, and inserts a leading edge of the pulled out printing plate 12 between the inverting roller 32 and the conveying belt 36. The chain double-dashed lines in FIG. 1 schematically illustrate movement positions of the suction cups 38.

In the inverting unit 28, the inverting roller 32 and the conveying belt 36 rotate in a direction in which the printing plate 12 is pulled out from the cassette 16 (direction of arrow A in FIG. 1). The printing plate 12 is nipped by the inverting roller 32 and the conveying belt 36, pulled out from the cassette 16, and trained onto the peripheral surface of the inverting roller 32. Thus, the printing plate 12 is conveyed in a curved path and inverted. The radius of the inverting roller 32 is such that the printing plate 12 is not broken or curled when curved on the inverting roller 32 (e.g. 100 mm or more).

As shown by the solid lines and the chain double-dashed lines in FIG. 1, the side plates 26 move horizontally according to the position of the cassette 16 from which the printing plate 12 is pulled out. Thus, the suction cups 38 of the sheet feeder unit 30 are brought to face the printing plate 12 in the selected cassette 16.

Further, the side plates 26 are provided with a guide 40 at a portion thereof below the small roller 34D. The printing plate 12 inverted by the inverting roller 32 is sent out from between the inverting roller 32 and the conveying belt 36 at the small roller 34D side, toward the guide 40. A conveyor 42 is disposed above the recording section 22. The printing plate 12 sent out from the inverting unit 28 is guided by the guide 40 onto the conveyor 42.

The guide 40 pivot along with the movement of the side plates 26 in order to guide the printing plate 12 always in a direction toward the conveyor 42. The small roller 34D at the recording section 22 side moves along with the movement of the side plates 26 to change the direction in which the printing plate 12 is sent out from the inverting unit 28. The small roller 34C moves so that a substantially constant tension is applied to the conveying belt 36 when the small roller 34D moves. Thus, the printing plate 12 sent out from the inverting unit 28 is gently bent by the guide 40.

The conveyor 42 is formed of a roller 44 in the vicinity of a lower portion of the plate feeding-conveying section 20, a roller 46 in the vicinity of an upper portion of the recording section 22a, and a conveying belt 48 trained around the rollers 44 and 46, and is inclined so that the roller 46 side is lower than the other side.

Figure 2:
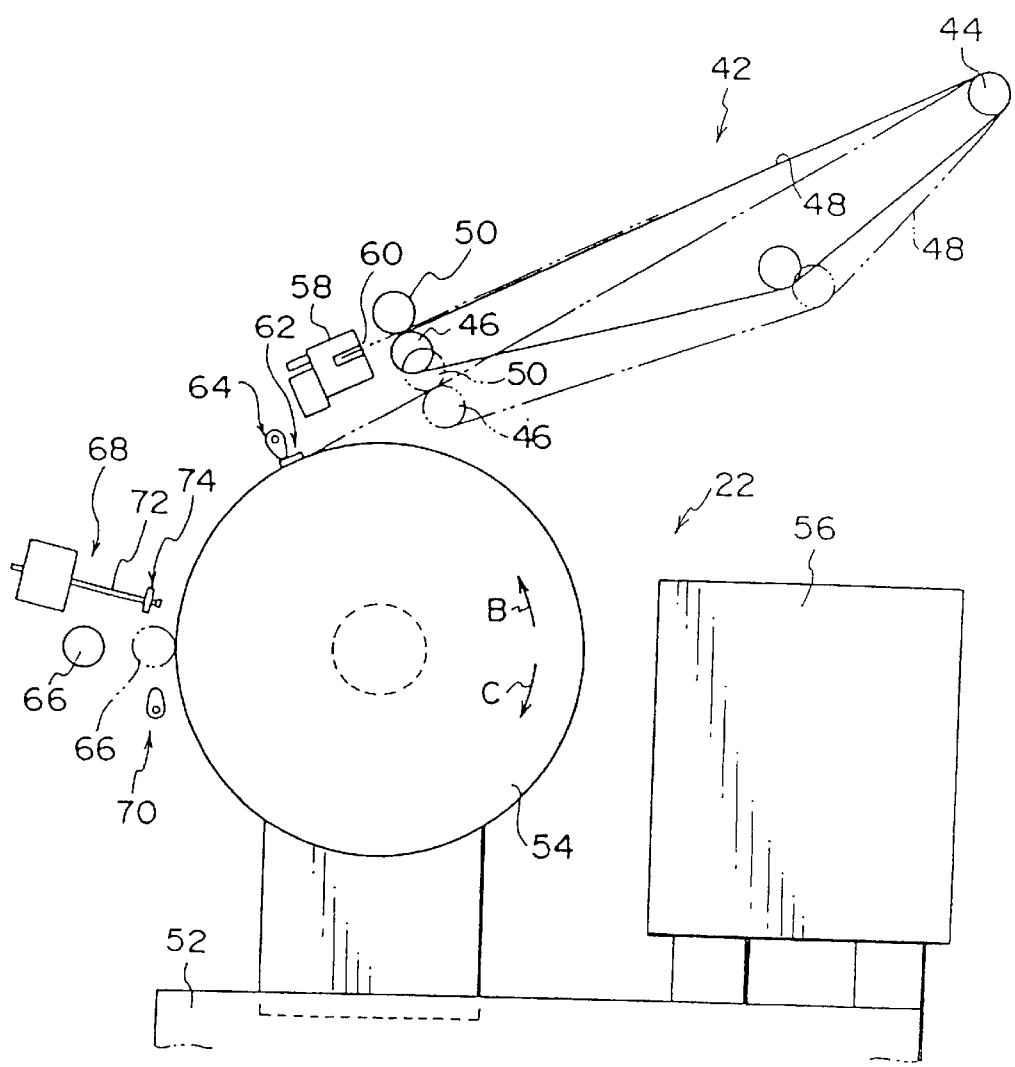
FIG. 2 is a view showing a schematic structure of a recording section of the image exposing apparatus.

As shown in FIGS. 1 and 2, a roller 50 facing the roller 46 is disposed at the conveyor 42. The printing plate 12 sent onto the conveyor 42 is conveyed on the conveying belt 48, and nipped between the rollers 46 and 50. In the recording section 22, a rotating drum 54 and a recording head section 56 are disposed on a stand 52. Further, a puncher 58 is disposed above the rotating drum 54.

As shown in FIG. 2, a holding mouth 60 is formed at the puncher 58. The printing plate 12 is nipped by the rollers 46 and 50 of the conveyor 42 and the leading edge thereof is inserted and held in the holding mouth 60 of the puncher 58. When the leading edge of the printing plate 12 is inserted in the holding mouth 60, the puncher 58 punches, for example, a notch for alignment at a predetermined position of the leading edge of the printing plate 12.

When the notch is formed in the printing plate 12, the conveyor 42 drives the rollers 46 and 50 as well as the conveying belt 48 in the reverse direction to pull out the leading edge of the printing plate 12 from the holding mouth 60 of the puncher 58. The conveyor 42 is provided with an unillustrated swinging means. Due to this swinging means, the conveyor 42 is moved downwards with the roller 44 side being an axis, such that the roller 46 side is adjacent to the rotating drum 54 in recording section 22 (shown in FIGS. 1 and 2 by the chain double-dashed lines). Thus, the leading edge of the printing plate 12 on the conveying belt 48 is directed to a predetermined position on the outer peripheral surface of the rotating drum 54, and the printing plate 12 is conveyed on the conveying belt 48 toward the rotating drum 54.

The rotating drum 54 is rotated by a driving means (not shown) in a loading and exposing direction of the printing plate 12 (a direction in which the printing plate 12 is loaded and exposed, i.e. direction of arrow B of FIGS. 1 and 2) and in a unloading direction of the printing plate 12 (a direction in which the printing plate 12 is unloaded, i.e. direction of arrow C of FIGS. 1 and 2), which direction is opposite to the loading and exposing direction.

As shown in FIG. 2, a leading edge chuck 62 is attached at a predetermined position on the outer peripheral surface of the rotating drum 54 provided in the recording section 22. In the recording section 22, when the printing plate 12 is loaded on the rotating drum 54, first, the rotating drum 54 is stopped in a position in which the leading edge chuck 62 faces the leading edge of the printing plate 12 being fed by the conveyor 42 (a printing plate loading position).

A loading cam 64 which faces the leading edge chuck 62 in the printing plate loading position is provided in the recording section 22. The loading cam 64 rotates and presses one end side of the leading edge chuck 62 to allow the leading edge of the printing plate 12 to be inserted between the leading edge chuck 62 and the peripheral surface of the rotating drum 54. In the recording section 22, by releasing the pressure from the loading cam 64 onto the leading chuck 62 by returning the loading cam 64 in a state in which the leading edge of the printing plate 12 is inserted between the leading chuck 62 and the rotating drum 54, the leading edge of the printing plate 12 is nipped and held between the leading edge chuck 62 and the peripheral surface of the rotating drum 54. At this time, a positioning pin (not shown), which is provided so as to project from a predetermined position on the peripheral surface of the rotating drum 54, enters the notch formed in the printing plate 12 by the puncher 58, thereby aligning the printing plate 12 with respect to the rotating drum 54.

In the recording section 22, when the leading edge of the printing plate 12 is fixed onto the rotating drum 54, the rotating drum 54 is rotated in the loading and exposing direction. Thus, the printing plate 12 being sent from the conveyor 42 is wound around the peripheral surface of the rotating drum 54.

A squeeze roller 66 is disposed in the vicinity of the peripheral surface of the rotating drum 54 and at a downstream side in the loading and exposing direction with respect to the printing plate loading position. The squeeze roller 66 moves toward the rotating drum 54 and presses the printing plate 12, being wound onto the rotating drum 54, against the rotating drum 54 so that the printing plate 12 closely contacts the peripheral surface of the drum 54.

Further, in the recording section 22, a trailing edge chuck attaching/detaching unit 68 is provided in the vicinity of an upstream side in the loading and exposing direction of the rotating drum 54 with respect to the squeeze roller 66, and an unloading cam 70 is disposed in the vicinity of a downstream side in the loading and exposing direction with respect to the squeeze roller 66. A trailing edge chuck 74 is provided at a tip portion of a shaft 72, projecting toward the rotating drum 54, of the trailing edge chuck attaching/detaching unit 68.

In the recording section 22, when the trailing edge of the printing plate 12 wound on the rotating drum 54 faces the trailing edge chuck attaching/detaching unit 68, the shaft 72 is projected and the trailing edge chuck 74 is attached at a predetermined position of the rotating drum 54. Thus, the trailing edge of the printing plate 12 is nipped and held between the trailing edge chuck 74 and the rotating drum 54.

In the recording section 22, when the leading edge and the trailing edge of the printing plate 12 are held on the rotating drum 54, the squeeze roller 66 is moved away from the rotating drum 54. Then, the printing plate 12 is irradiated with light beams, which are modulated on the basis of image data, from the recording head section 56 synchronously with the rotation of the rotating drum 54 while the drum is rotated at a predetermined high rotating speed. Thus, the printing plate 12 is scan-exposed on the basis of the image data.

In the recording section 22, when the scan-exposure onto the printing plate 12 has been completed, the rotating drum 54 is temporarily stopped in a position in which the trailing edge chuck 74 holding the trailing edge of the printing plate 12 faces the trailing edge chuck attaching/detaching unit 68, and the printing plate 12 is nipped between the squeeze roller 66 and the rotating drum 54. When the rotation of the rotating drum 54 is stopped iv the position in which the trailing edge chuck 74 faces the trailing edge chuck attaching/detaching unit 68, the trailing edge chuck attaching/detaching unit 68 detaches the trailing edge chuck 74 from the rotating drum 54. Thus, the trailing edge of the printing plate 12 is released.

In the recording section 22, when the trailing edge chuck 74 is detached from the rotating drum 54, the rotating drum 54 is rotated in the unloading direction of the printing plate 12. Thus, the printing plate 12 is sent out from between the squeeze roller 66 and the rotating drum 54.

As shown in FIG. 1, the ejecting buffer section 24 is provided above the squeeze roller 66. As the rotating drum 54 rotates in the unloading direction of the printing plate 12, the printing plate 12 is sent out, with its trailing edge coming first, toward the ejecting buffer section 24. The rotating drum 54 is rotated in the unloading direction of the printing plate 12, and is stopped at the printing plate unloading position where the leading edge chuck 62 faces the unloading cam 70. In this position, the unloading cam 70 is rotated to press the leading edge chuck 62, and the nipping of the leading edge of the printing plate 12 between the leading edge chuck 62 and the rotating drum 54 is thereby released. Thus, the printing plate 12 is unloaded from the rotating drum 54.

The ejecting buffer section 24 is provided at an inner side of an ejection port 76 formed in the machine frame 14, and includes an ejecting roller 78. A plurality of small rollers (e.g. five small rollers 80A, 80B, 80C, 80D and 80E) are arranged around the ejecting roller 78, and an endless conveying belt 82 is trained over the small rollers 80A through 80E. Thus, the conveying belt 82 is trained over a portion of the ejecting roller 78 which spans about a half to one third of the periphery of the ejecting roller 78 between the small roller 80A and the small roller 80D.

The small roller 80A is provided so as to project toward the squeeze roller 66 of the recording section 22, and a roller 84 is disposed to face the small roller 80A. The printing plate 12 sent out from the recording section 22 is guided toward and nipped between the small roller 80A and the roller 84.

In the ejecting buffer section 24, the ejecting roller 78 is rotatably driven in a direction in which the printing plate 12 is pulled in (direction of arrow D) and pulls the printing plate 12 nipped between the small roller 80A and the roller 84 into a nip between the ejecting roller 78 and the conveying belt 82. Thus, the printing plate 12 is trained around the ejecting roller 78. At this time, in the ejecting buffer section 24, the leading edge of the printing plate 12 (which was the trailing edge when sent out from the recording section 22) is nipped between the small roller 80A and the roller 84, and thus the printing plate 12 trained around the ejecting roller 78 is temporarily retained.

As illustrated by the chain double-dashed lines in FIG. 1, in the ejecting buffer section 24, the small roller 80A and the roller 84 are moved to a position in front of the ejection port 76. At this time, the small roller 80A and the idle roller 84 rotates together to guide the leading edge of the printing plate 12 toward the ejection port 76. While, the small roller 80B positioned above the small roller 80A moves along with the movement of the small roller 80A in order to apply a constant tension onto the conveying belt 82.

In the ejecting buffer section 24, as the leading edge of the printing plate 12 is directed to the ejection port 76, the ejecting roller 78 is rotatably driven in a direction in which the printing plate 12 is sent out (a direction opposite to the direction of arrow D) at a rotating speed proportional to the conveying speed of the printing plate 12 in a processing apparatus such as an automatic developing apparatus, or the like, placed next to the ejection port 76. Thus, the printing plate 12 is sent out from the ejection port 76.

As described above, the leading edge chuck 62 for fixing the leading edge of the printing plate 12 in the predetermined position on the peripheral surface of the rotating drum 54 when the printing plate 12 is wound around the rotating drum 54 is attached to the rotating drum 54, and the trailing edge chuck 74 for fixing the trailing edge of the printing plate 12 is attached to the rotating drum 54.

Figure 3:
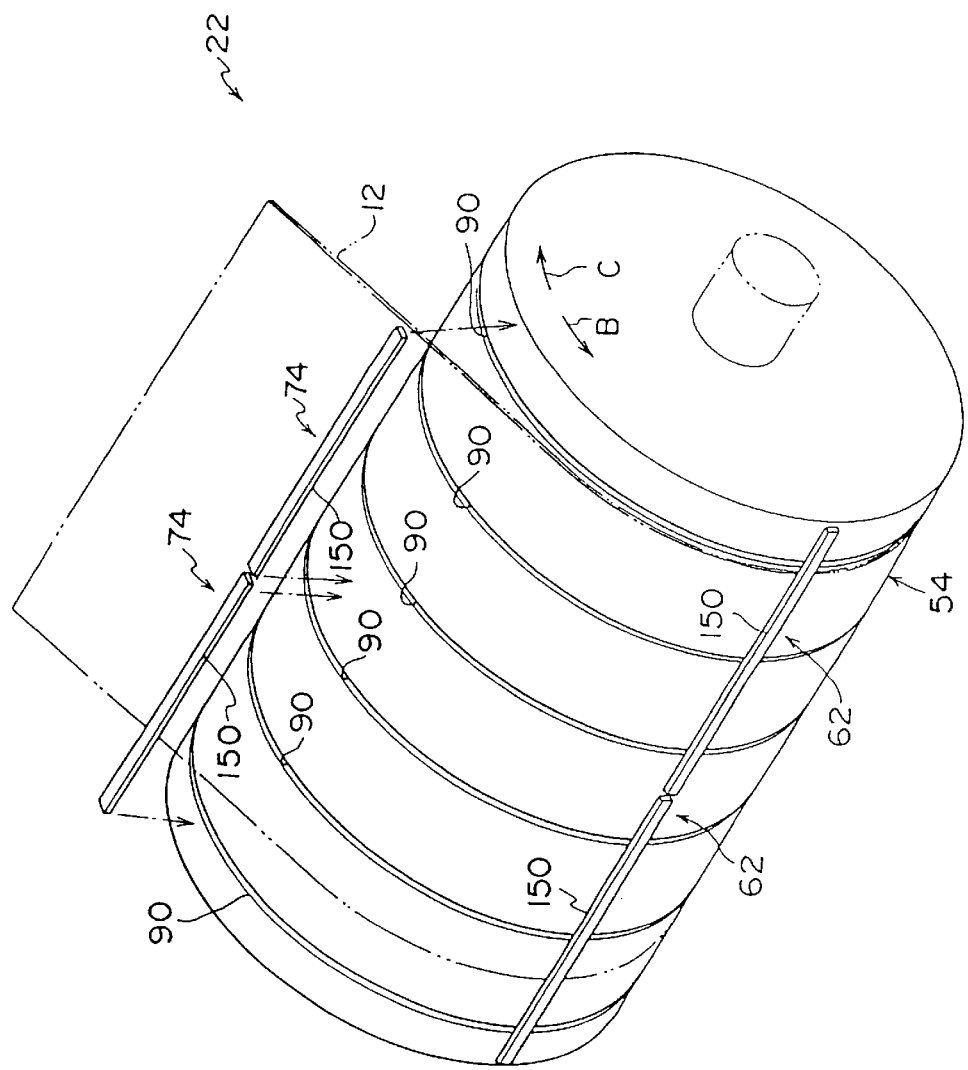
FIG. 3 is a perspective view schematically showing arrangement of a leading edge chuck and a trailing edge chuck with respect to a rotating drum.

As shown in FIG. 3, the leading edge chuck 62 includes strip-shaped plates 150 having a predetermined length, which are arranged substantially in a row along the axial direction of the rotating drum 54 with a predetermined spacing. Similarly, the trailing edge chuck 74 includes strip-shaped plates 150 having a predetermined length, which are to be attached to the rotating drum 54 with being arranged on the peripheral surface of the rotating drum 54 with a predetermined spacing.

Figure 4:
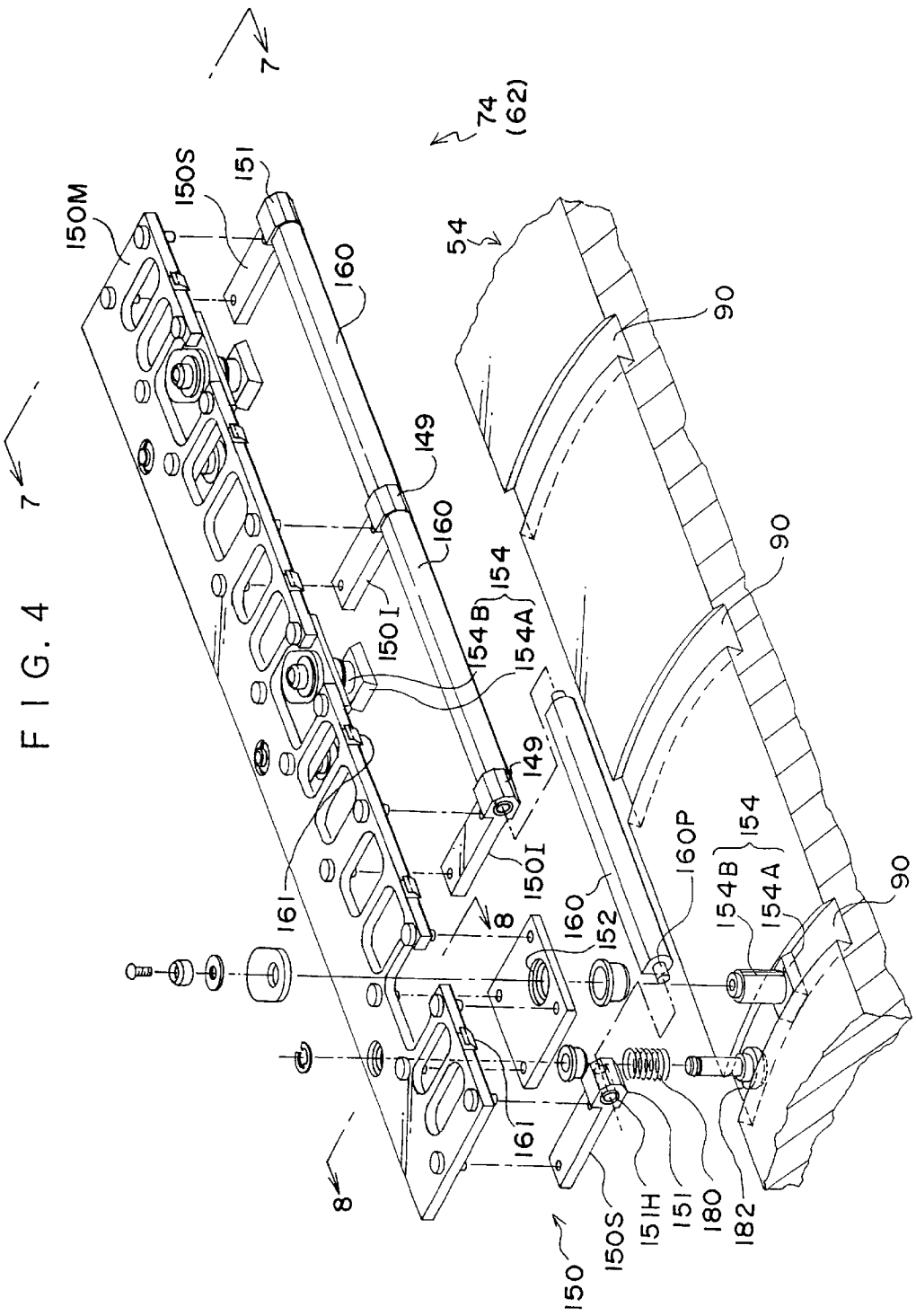
FIG. 4 is an exploded perspective view of a main portion of the trailing edge chuck forming one of holding devices.

As shown in FIG. 4, the plate 150 includes a plate main body 150M which is pivotably supported by supporting posts 154 described later, side engaging members 150S which are fixed at opposite sides of the plate main body 150M with screws and engage with clamp portions 160 described later, and inner engaging members 150I which are fixed to the plate main body 150M at positions respectively apart from the side engaging members 150S by a predetermined distance (corresponding to a length of the respective clamp portion 160) and engage with the clamp portions 160.

The leading edge chuck 62 and the trailing edge chuck 74 have substantially the same structure. However, the plates 150 are arranged in different orientations.

Figure 5:
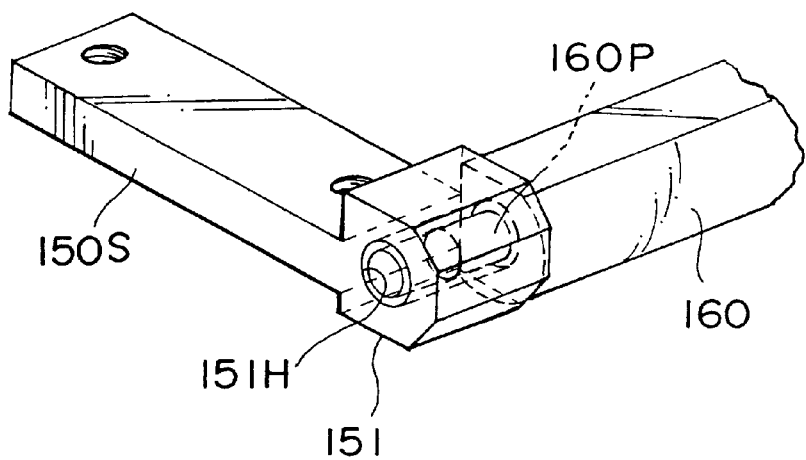
FIG. 5 is a partial perspective view showing that a clamp portion is rotatable.

Referring to FIGS. 4 and 5, structures of the leading edge chuck 62 and the trailing edge chuck 74 are described below. As an example, the trailing edge chuck 74 provided with a mechanism which is detachable with respect to the rotating drum 54 is described. A structural difference between the leading edge chuck 62 and the trailing edge chuck 74 of the present embodiment is that the leading edge chuck 62 is fixed to the rotating drum 54, while the trailing edge chuck 74 is attached and detached with respect to the rotating drum 54.

Each of the plates 150 forming the trailing edge chuck 74 is provided with three through holes 152 formed at predetermined three points along a longitudinal direction of the plate 150 which are at middle portion in a width direction of the plate 150, and supporting posts 154 are inserted into the through holes 152. Each of the supporting posts 154 consists of a base portion 154A in a rectangular block shape (described in detail later) and a supporting portion 154B standing from the upper surface of the base portion 154A. A cylindrical spacer 156 is mounted on the base of the supporting portion 154B so that the plate 150 can be supported at a predetermined distance from the base portion 154A.

While, as shown in FIG. 3, a plurality of grooves 90 are formed with a predetermined spacing in the peripheral surface of the rotating drum 54. When the trailing edge chuck 74 is attached to the rotating drum 54, the base portions 154A of the supporting posts 154 are accommodated in the grooves 90. In this accommodated state, the supporting posts 154 are rotatable in the peripheral direction of the drum around contact points of the grooves 90 and the supporting posts 154.

As shown in FIG. 6, a sectional form of the groove 90 is substantially trapezoid, whose width dimension W1 of an opening edge is smaller than whose width dimension W2 of a bottom portion. While a shape of a portion of the supporting post 154 accommodated in the groove 90 is rectangular, in which a dimension of one side of an opposing pair of sides (one of two opposing pairs of sides) W3 is smaller than the width dimension W1 of the opening of the groove 90, and a dimension W4 of the other side (the other pair of sides) is smaller than the width dimension W2 of the bottom 90A of the groove 90 and larger than the width dimension W1 of the opening 90B. Therefore, the supporting post 154 can be inserted into the groove 90 by directing it so that the smaller width sides thereof are positioned along the width direction of the groove 90. By turning the supporting post 154 by about 90° after insertion, it is prevented from coming off.

Since the leading edge chuck 62 is fixed, it needs not to have a detachable structure such as described above. The leading edge chuck 62 may be fixed, for example, by bolting or the like, however, the same structure may be applied, and may always be in fixed state.

Figure 8:
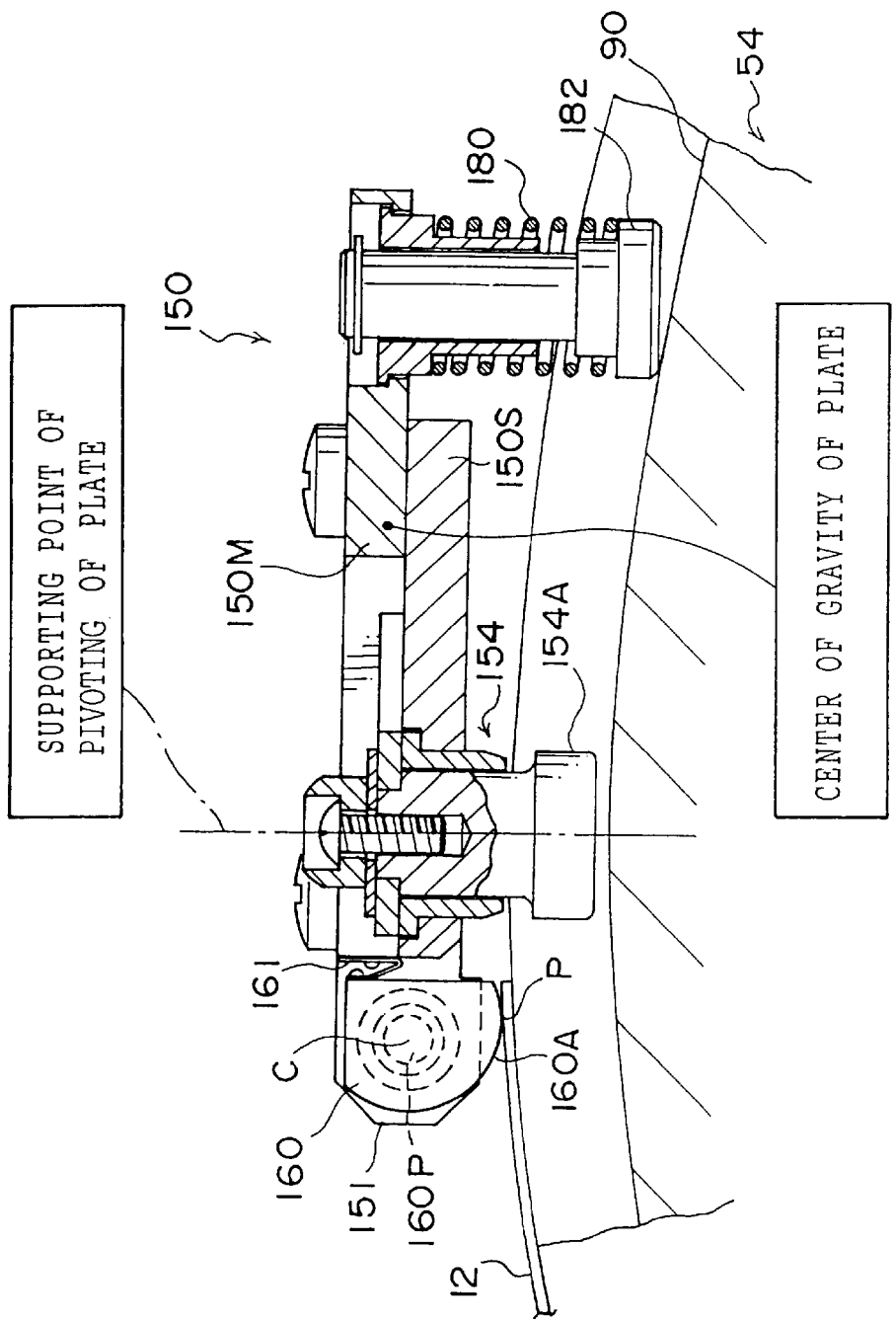
FIG. 8 is a sectional view taken along line 8—8 in FIG. 4 and viewed in a direction of arrows.
Figure 9:
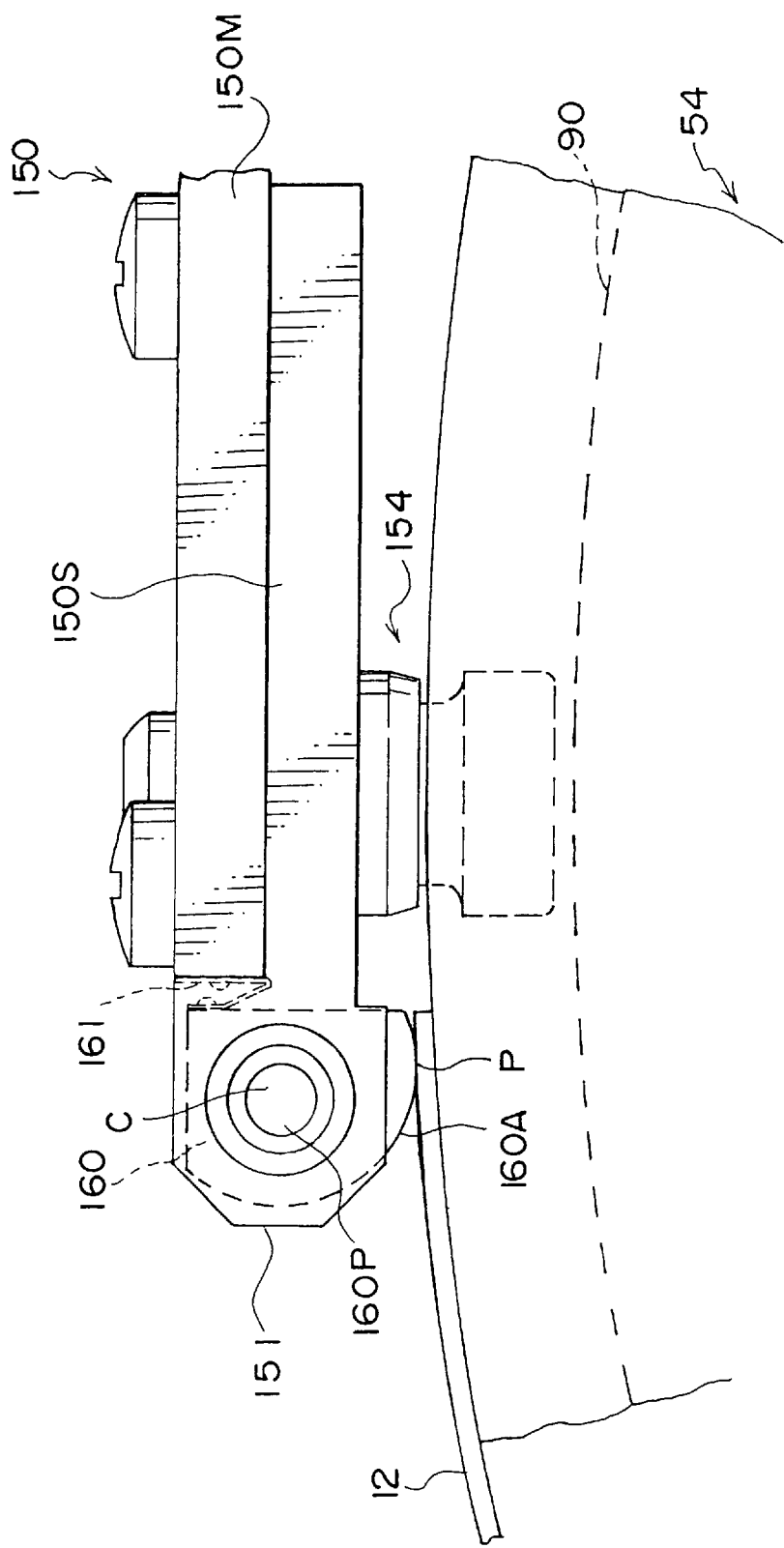
FIG. 9 is an enlarged partial view of FIG. 7.
Figure 10:
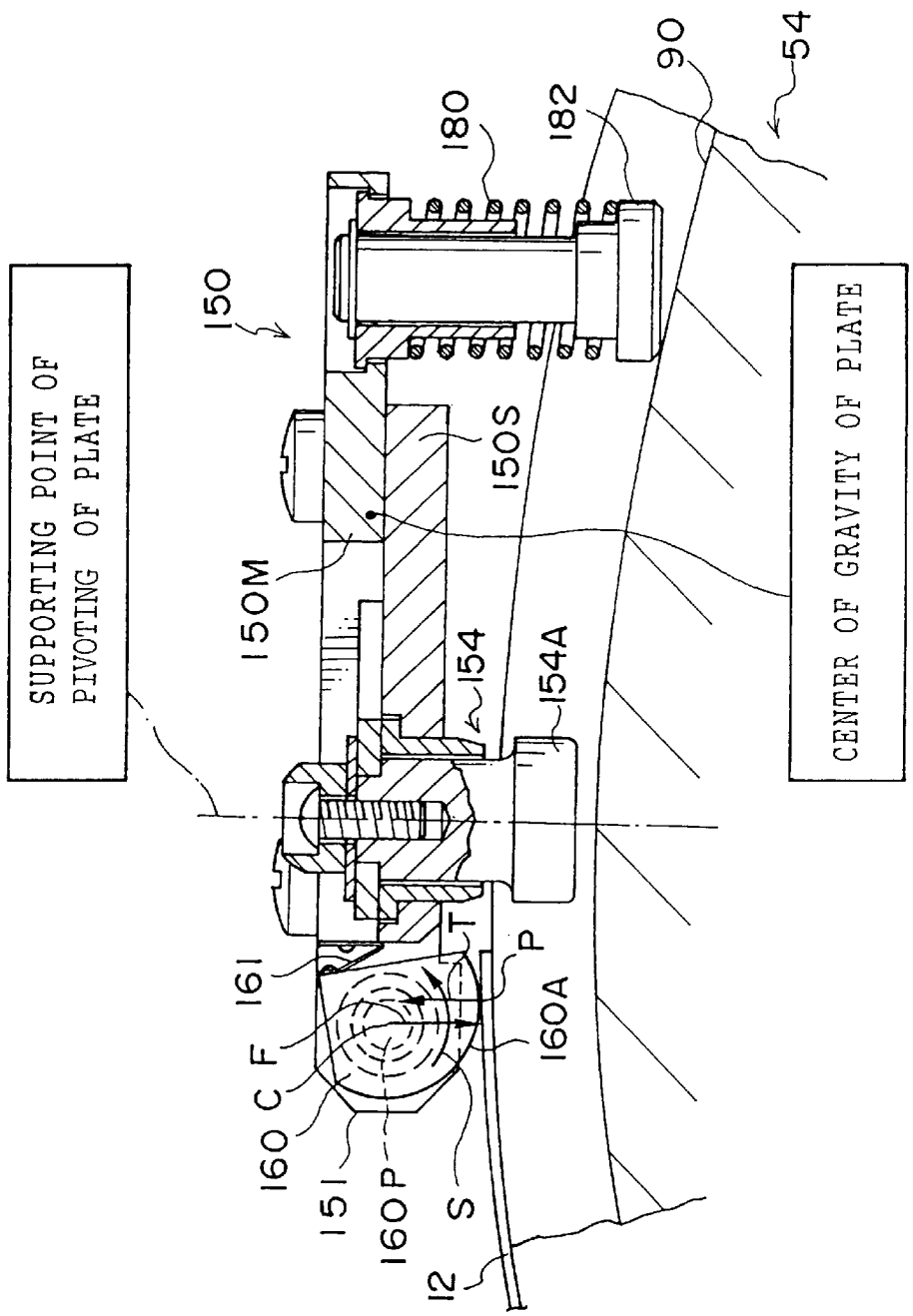
FIG. 10 is a sectional view showing the clamp portion being rotated in a direction in which it tensions a printing plate by a centrifugal force generated in a plate.

A center of gravity of the plate 150 is positioned to the right with respect to an axis of the supporting post 154 in a state in which all the parts are assembled (see FIGS. 8 and 10).

The clamp portions 160 are pivotably engaged with the plate 150 of the trailing edge chuck 74 at one end side in the width direction thereof. Each of the clamp portions 160 is formed of stick-like nipping member having a curved convex surface 160A (see FIG. 7), which makes linear contact with the printing plate 12, at a side thereof facing the rotating drum 54.

The plate 150 is provided with the three clamp portions 160 in a series in the longitudinal direction. Round bar-shaped engaging projecting portions 160P are provided at opposite sides of the respective clamp portions 160 so as to project from both sides in parallel with the axis of rotation of the rotating drum 54.

As shown in FIG. 5, a side engaging portion 151 having an engaging hole 151H, which is formed in parallel with the axis of rotation of the rotating drum 54, is formed at a tip portion of the respective side engaging members 150S. Thus, the engaging projecting portions 160P pivotably engage with the corresponding engaging holes 151H. Similarly, an inner engaging portion 149 is formed at a tip portion of the respective inner engaging members 150I, with which the engaging projecting portions 160P pivotably engage.

Figure 11:
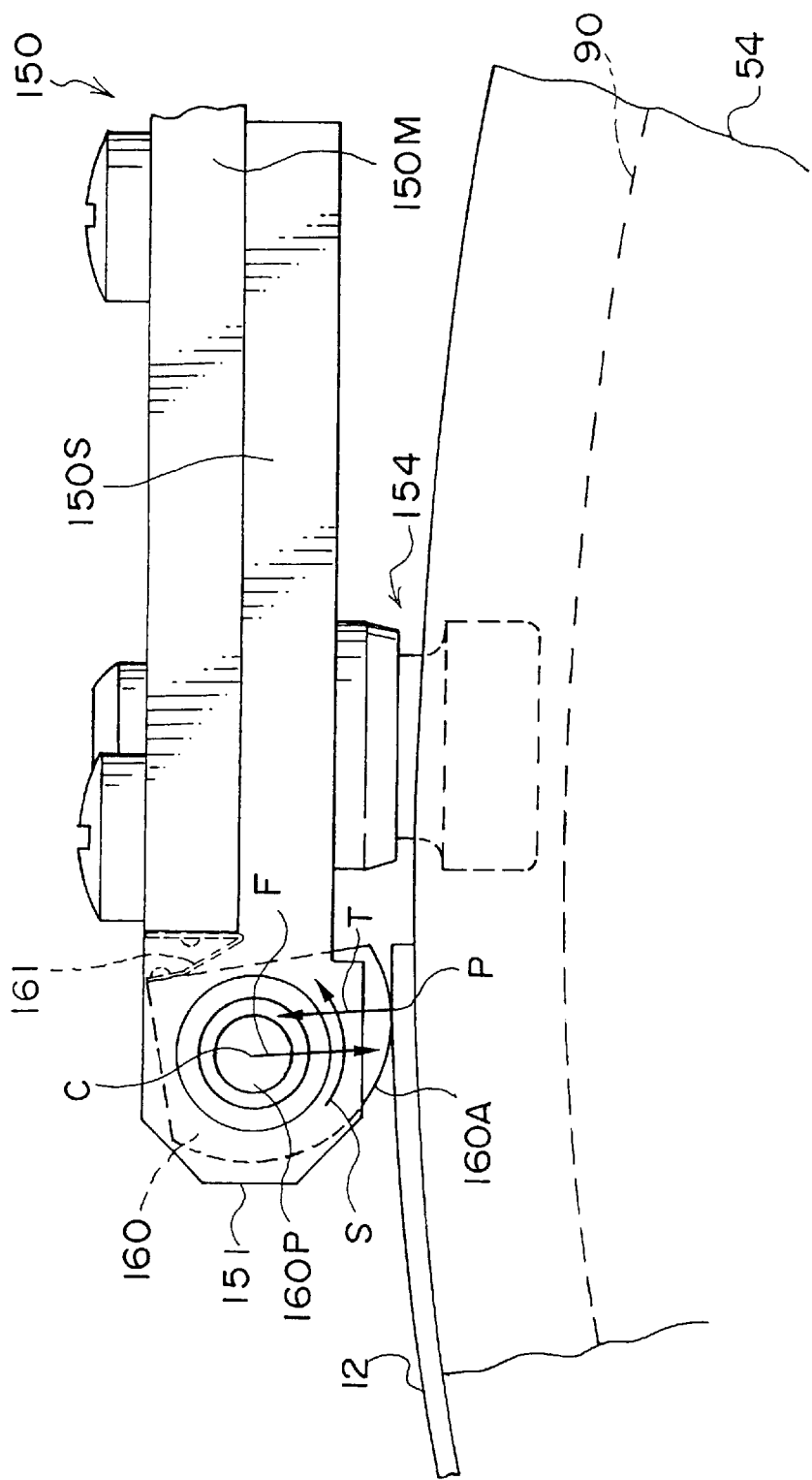
FIG. 11 is an enlarged partial side view of the plate in the state shown in FIG. 10.
Figure 12:
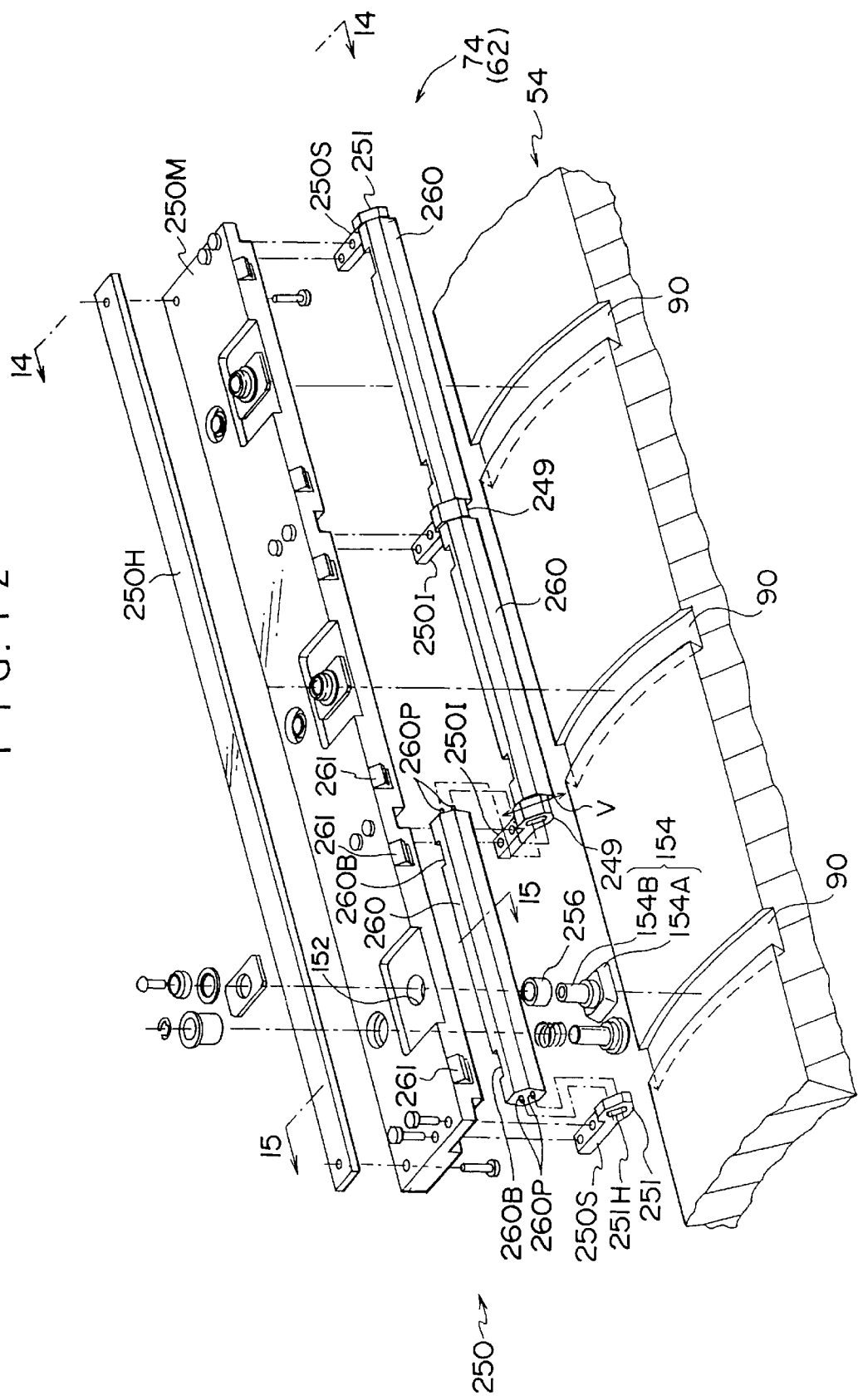
FIG. 12 is an exploded perspective view showing a main portion of a trailing edge chuck forming one of holding devices of a second embodiment of the present invention.
Figure 14:
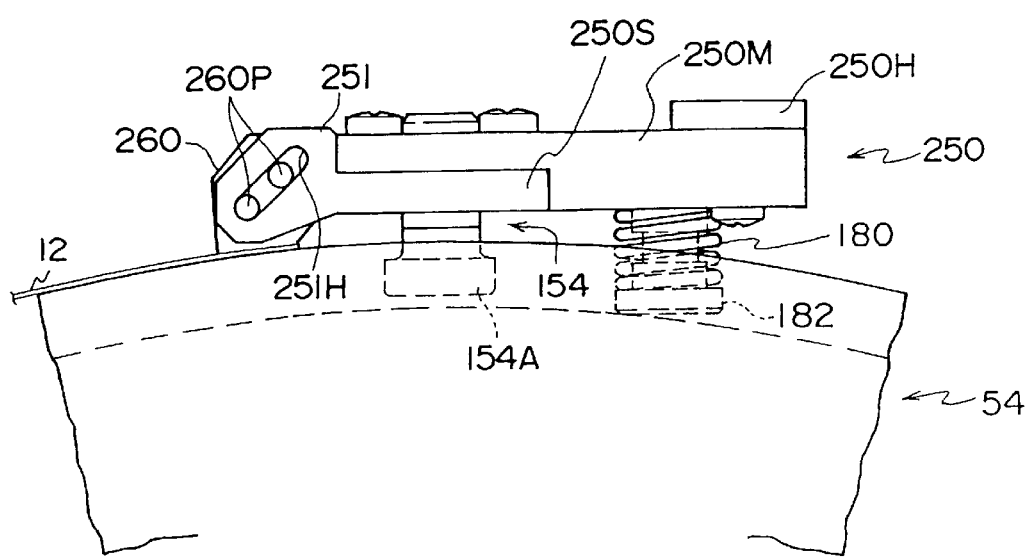
FIG. 14 is a side view taken along line 14—14 in FIG. 12 and viewed in a direction of arrows.

As shown in FIGS. 10 and 11, when a force, which brings the clamp portions 160 close to the peripheral surface of the drum (nipping force) works on the clamp portions 160 due to a centrifugal force generated in the plate 150, the clamp portions 160 rotate counterclockwise in FIGS. 10 and 11 (in direction S), that is, in a direction in which they apply a tension to the printing plate 12.

A tension plate spring 161 (returning element) for exerting a tensile force is provided between a right side surface of the respective clamp portions 160 shown in FIGS. 8 and 10 and a side surface of the plate main body 150M. When the printing plate 12 is not nipped, the respective clamp portion 160 is urged by an urging force of the tension plate spring 161 so as to be completely rotated clockwise in FIGS. 8 and 10 (hereinafter, this position is called a "original position").

Figure 7:
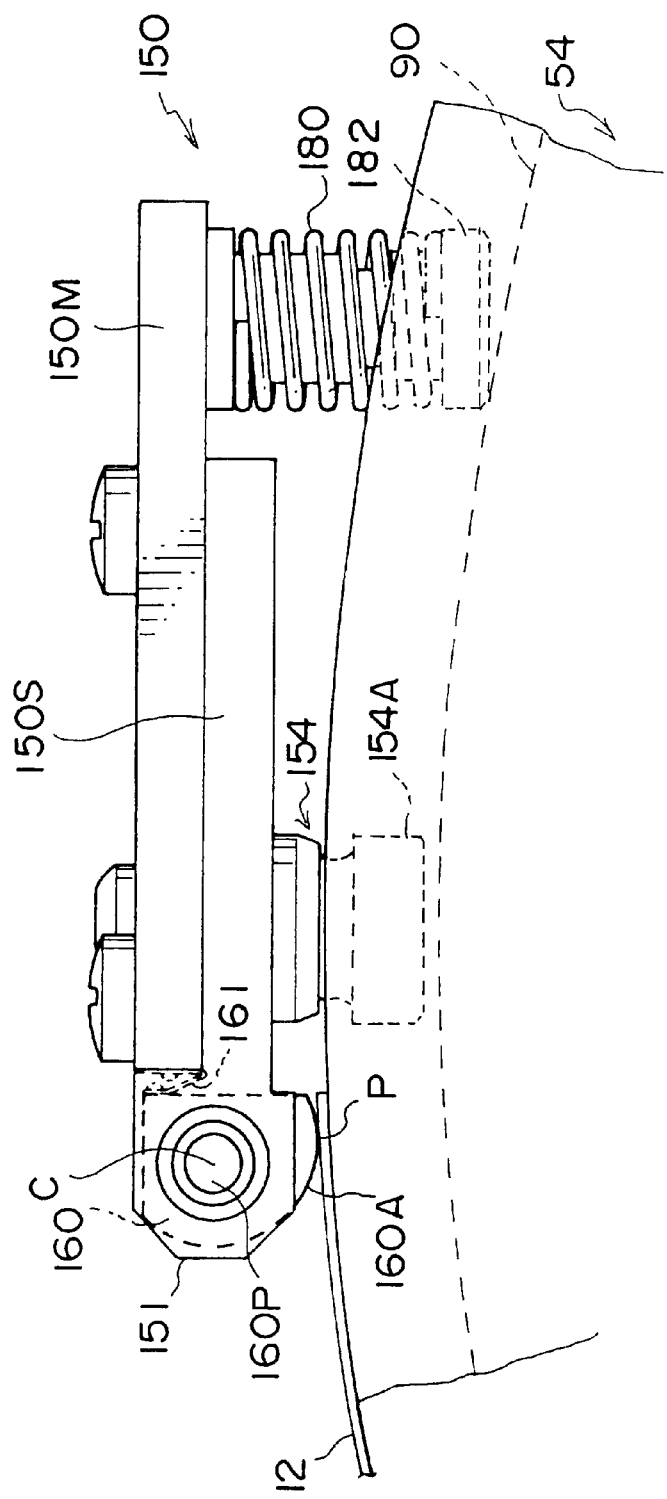
FIG. 7 is a side view taken along line 7—7 in FIG. 4 and viewed in a direction of arrows.

Further, one end portion of a compression coil spring 180 is fixed to a lower surface side of a right end portion of the plate 150 shown in FIGS. 7 and 8. An urging force of the compression coil spring 180 is directed toward the rotating drum 54, and the other end portion of the compression coil spring 180 is provided with a cover 182 which abuts on the bottom portion 90A of the groove 90 of the rotating drum 54.

When being attached to the rotating drum 54, the compression coil spring 180 provided with the cover 182 is accommodated in the groove 90 provided to the rotating drum 54. That is, when the trailing edge chuck 74 moves close to the rotating drum 54, first, the cover 182 abuts on the bottom surface of the groove 90, and when the trailing edge chuck 74 moves closer to the rotating drum 54, the compression coil spring 180 resiliently deforms. The urging force generated by this resilient deformation makes the plate 150 pivot around the supporting post 154, thereby forming a pressing force of the clamp portions 160. When the compression coil spring 180 resiliently deforms, the cover 182 slides on the bottom surface of the groove 90. Since this sliding surface has a circular arc sectional form and has relatively small friction coefficient, it can slide smoothly.

Operation of the present embodiment is described below.

In the image exposing apparatus 10, image data for exposing the printing plate 12 is input, then the size and number of the printing plates 12 which are to be exposed are set. When starting of image exposure is instructed, an image exposure process onto the printing plate 12 is started. The process may also be instructed via operation of switches on a control panel provided at the image exposing apparatus 10, or the start of the processing at the image exposing apparatus 10 may be instructed via a signal sent from an image processing apparatus, or the like, which outputs image data to the image exposing apparatus 10.

In the image exposing apparatus 10, when the start of the processing is instructed, the inverting unit 28 and the sheet feeder unit 30 are moved together to a position corresponding to the cassette 16 accommodating the printing plates 12 of the specified size, and the printing plate 12 in the corresponding cassette 16 is sucked and taken out by the suction cups 38 to be sent between the inverting roller 32 and the conveying belt 36 of the inverting unit 28. Thus, the printing plate 12 is nipped and conveyed by the inverting roller 32 and the conveying belt 36 to be sent onto the conveyor 42.

First, the conveyor 42 inserts the leading edge of the printing plate 12 into the holding mouth 60 of the puncher 58. The puncher 58 forms a notch for alignment at a predetermined position of the inserted printing plate 12. When the notch has been formed in the printing plate 12, the conveyor 42 pulls out the printing plate 12 from the holding mouth 60 of the puncher 58 and sends it out toward the peripheral surface of the rotating drum 54.

In the recording section 22, the leading edge of the printing plate 12 is held on the rotating drum 54 by the leading edge chuck 62, and the printing plate 12 is wound around the rotating drum 54 while being squeezed by the squeezing roller 66. Then, the trailing edge of the printing plate 12 is held on the rotating drum 54 by the trailing edge chuck 74. This holding procedure will be described later. Subsequently, in the recording section 22, the printing plate 12 is irradiated with light beams based on image data from the recording head section 56 while the rotating drum 54 is rotated at a high speed, thus scan-exposure of the printing plate 12 is effected. During this high speed rotation, as an effect of a centrifugal force generated by the rotation of the rotating drum 54, the leading edge chuck 62 and the trailing edge chuck 74 exert a force to nip the printing plate 12 and a force to apply a tension to the printing plate 12 (for preventing the printing plate 12 from being partially lifted from the peripheral surface of the rotating drum 54). Details of this operation is described later together with the holding procedure.

When the printing plate 12 has been scan-exposed, leading edge chuck 62 (the trailing edge chuck 74) is detached and the printing plate 12 is sent out to the ejecting buffer section 24.

In the ejecting buffer section 24, the printing plate 12 is nipped and conveyed by the small roller 80A and the roller 84, and is trained around the ejecting roller 78. Then, the small roller 80A and the roller 84 are directed to face the ejection port 76, and the printing plate 12 is sent out from the ejection port 76 at a predetermined conveying speed.

Procedures of nipping and tensioning, as well as holding, of the printing plate 12 on the rotating drum 54 by the leading edge chuck 62 and the trailing edge chuck 74 are described next. Since the leading edge chuck 62 and the trailing edge chuck 74 operate in the same manner, the trailing edge chuck 74 is described as an example.

(Attachment and Detachment of the Trailing Edge Chuck 74)

When attaching the trailing edge chuck 74 to the rotating drum 54, the base portions 154A of the supporting posts 154 are oriented so that the short sides thereof become parallel to the width direction of the openings of the grooves 90 of the rotating drum 54 so that the base portions 154A of the supporting posts 154 are accommodated in the grooves 90 of the rotating drum 54. Thus, the base portions 154A are smoothly accommodated in the grooves 90. After the accommodation, the entire supporting posts 154 are rotated about 90° so that the long sides thereof become parallel to the width direction of the openings of the grooves 90, thereby preventing the supporting posts 154 from coming off.

When the trailing edge chuck 74 is detached from the rotating drum 54, the base portions 154A are rotated around 90° and pulled out.

(Nipping of the Printing Plate 12 (Clamp))

When the edge of the printing plate 12 enters between the rotating drum 54 and the plates 150 of the leading edge chuck 62, inhibition of the rotation of the plate 150 by the cam 64 is cancelled, and the plates 150 pivot around the supporting posts due to the urging force applied from the compression coil spring 180. By this pivoting movement, the clamp portions 160 move toward the peripheral surface of the rotating drum 54, and thus, the printing plate 12 can be nipped between the clamp portions 160 and the peripheral surface of the rotating drum 54.

The trailing edge chuck 74 is attached to the rotating drum 54 when the printing plate 12 has reached a predetermined position. Along with the attaching movement, the urging force of the compression coil springs 180 works (the covers 182 of the compression coil springs 180 reach fastest the bottom surfaces of the grooves 90) to gradually pivot the plates 150 around the supporting posts 154, thereby nipping the aligned printing plate 12 between the plates 150 and the peripheral surface of the rotating drum 54.

As the printing plate 12 is held by the leading edge chuck 62 and the trailing edge chuck 74, the rotating drum 54 starts high speed rotation for recording an image.

By a centrifugal force generated by this rotation, the plates 150 pivot around the supporting posts. Since the center of gravity of the respective plate 150 is positioned at a side opposite to the clamp portion 160 with respect to the supporting post 154, a direction of the pivot of the plates 150 caused by the centrifugal force is the same as that of the pivot thereof caused by the urging force applied from the compression coil springs 180. Therefore, this increases the pressing force applied by the side engaging portions 151 and the inner engaging portions 149 onto the clamp portions 160. Thus, the force for nipping the leading and trailing edges of the printing plate 12 can be increased during the high speed rotation of the rotating drum 54, i.e., during image recording.

(Tensioning of the Printing Plate 12)

As shown in FIGS. 10 and 11, when a pressing force F, which brings the clamp portions 160 close to the peripheral surface of the drum, is applied from the plate main body 150M to the engaging projecting portions 160P as an effect of the centrifugal force generated in the plate 150 by high speed rotation of the rotating drum 54, the printing plate 12 is nipped on the peripheral surface of the drum by the clamp portions 160 and a reaction force T from the peripheral surface of the drum works on the curved convex surfaces 160A of the clamp portions 160.

A point of action P on the respective curved convex surfaces, on which the reaction force T works, is positioned in a tensioning direction of the printing plate 12 from the engaging projection portions 160P, that is, to the right of a pivot center C of the engaging projecting portions 160P shown in FIGS. 8 and 10.

Therefore, as shown in FIG. 11, a torque which rotates the clamp portions 160 counterclockwise (in direction S) is generated by the pressing force F and the reaction force T.

The torque which rotates the clamp portions 160 in the direction S from their original positions is greater than the urging force (tensile force) of the tension plate springs 161, and therefore the clamp portions 160 rotate in the direction S from their original points.

As the clamp portions 160 rotate in the direction S from the original positions, they pull the printing plate 12 nipped between them and the rotating drum 54 in the tensioning direction.

This action occurs both at the leading and trailing edges of the printing plate 12 simultaneously, so that the middle portion of the printing plate 12 can not be lifted with respect to the peripheral surface of the rotating drum 54 (the middle portion of the printing plate 12 is also held in close contact with the peripheral surface of the rotating drum 54).

If the printing plate 12 is partially lifted from the peripheral surface of the rotating drum 54, the lifted portion is out of the focus of the laser beam exposing the surface of the printing plate 12 for image recording. However, in the present embodiment, since the leading and trailing edges of the printing plate 12 are nipped between the clamp portions 160 and the rotating drum 54 (with a resultant force of the urging force of the compression coil spring 180 and the centrifugal force applied to the plate 150), and the printing plate 12 is tensioned, the middle portion of the printing plate 12 is also held in close contact with the peripheral surface of the rotating drum 54, thereby preventing deterioration of image quality.

As described above, in the present embodiment, besides the mechanism for holding the printing plate 12 by the clamp portions 160, the clamp portions 160 are pivoted due to the centrifugal force working on the plate 150 as a mechanism for applying a tensile force to the printing plate 12. Therefore, the printing plate 12 can be nipped on the peripheral surface of the drum without being partially lifted, or the like, from the peripheral surface of the drum. Further, in the present embodiment, the plate 150 can clamp/unclamp the printing plate with a smaller pivoting angle. Therefore, a projecting amount by which the plate 150 projects from the rotating drum 54 can be reduced.

In addition, since the clamp portions 160 are disposed at the tip portion of the one end in the width direction of the plate 150, gripper margins on the printing plate 12 can be reduced and an image-recordable area thereof can be increased.

In the present embodiment, a process of winding and holding the printing plate 12 on the rotating drum 54 is such that the leading edge chuck 62 is fixed and the trailing edge chuck 74 is detachable. However, both of the leading edge chuck 62 and the trailing edge chuck 74 may be detachable or fixed. The leading edge chuck 62 may also be detachable and the trailing edge chuck 74 may be fixed depending on a process of winding. A position of the chuck to be fixed is not limited.

As described above, in the present invention, when the sheet member is held in close contact with the peripheral surface of the drum, no unevenness is formed on the peripheral surface of the drum due to scratches and the like, the edges of the sheet member are held with certainty, and the sheet member is prevented from being partially lifted, or the like, from the peripheral surface of the drum. Thus, deterioration of image quality can be prevented.

<<Second Embodiment>>

A second embodiment of the present invention is described below with reference to FIGS. 12 to 18, wherein parts and portions which are common with the first embodiment described above are designated by the same reference numerals. In the following description, mainly features characteristic to the second embodiment are explained, and other features which have already been explained with respect to the first embodiment are not described in detail.

Each of plates 250 forming main portions of the leading edge chuck 62 and the trailing edge chuck 74 includes a plate main body 250M which is pivotably supported by supporting posts 154, side engaging members 250S which are fixed at opposite sides of the plate main body 250M with screws and engage with clamp portions 260 described later, inner engaging members 250I which are fixed to the plate main body 250M at positions respectively apart from the side engaging members 250S by a predetermined distance (corresponding to a length of the respective clamp portion 260) and engage with the clamp portions 260, and a strip-shaped weight adjusting plate 250H, which is fixed to the plate main body 250M, for increasing a centrifugal force generated by rotation of the rotating drum 54.

The clamp portions 260 are slidably engaged with the plate 250 at one end side in the width direction thereof. Each of the clamp portions 260 is formed of a stick-like nipping member having a flat surface (nipping surface) 260A (see FIG. 13) which at least faces the rotating drum 54.

The plate 250 is provided with the three clamp portions 260 in a series in the longitudinal direction, and the clamp portions 260 can slide in direction V (see FIG. 12) which is diagonal to the peripheral surface of the rotating drum 54.

Two round bar-shaped engaging projecting portions 260P are provided at opposite sides of the respective clamp portions 260 so as to project from both sides of the respective clamp portions 260.

As shown in FIG. 13, a side engaging portion 251 having a engaging hole 251H which is long in diagonal direction with respect to the peripheral surface of the rotating drum 54 is formed at a tip portion of the respective side engaging members 250S. Thus, engaging projecting portions 260P slidably engage with the corresponding engaging holes 251H so as to be slidable in a longitudinal direction of the engaging holes 251H. Similarly, an inner engaging portion 249 is formed at a tip portion of the respective inner engaging members 250I, with which the engaging projecting portions 260P slidably engage.

Figure 17:
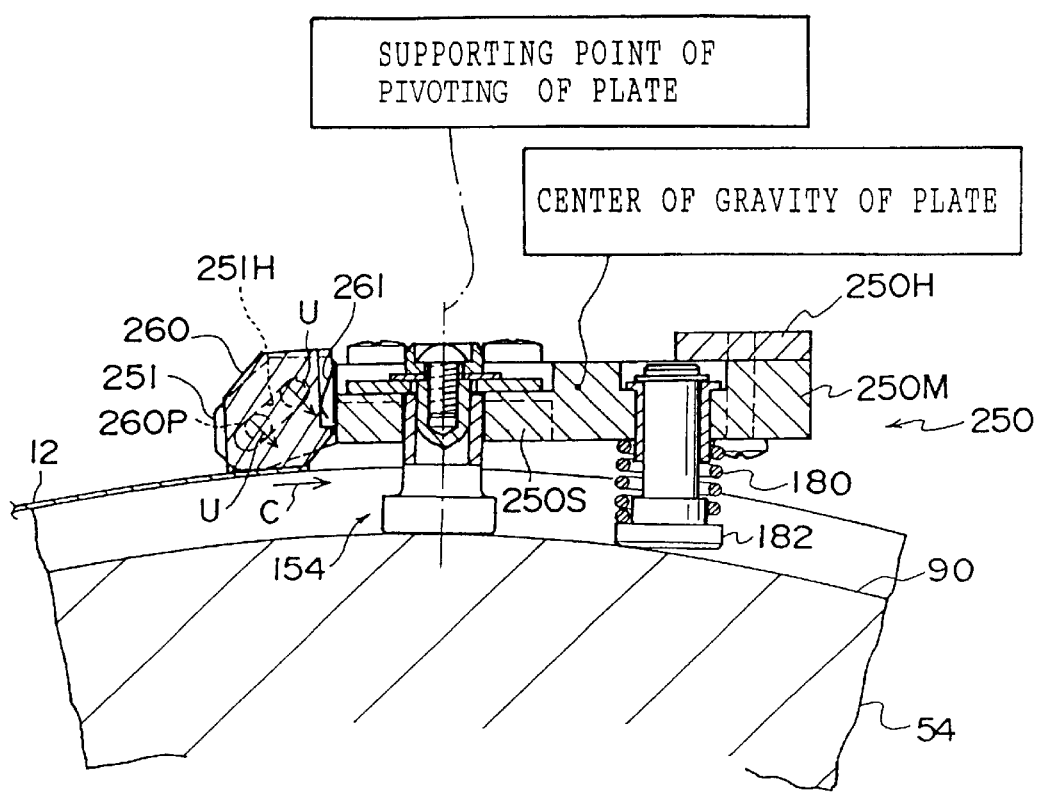
FIG. 17 is a sectional view showing the clamp portion being moved in a direction in which it tensions a printing plate by a centrifugal force generated in a plate.
Figure 18:
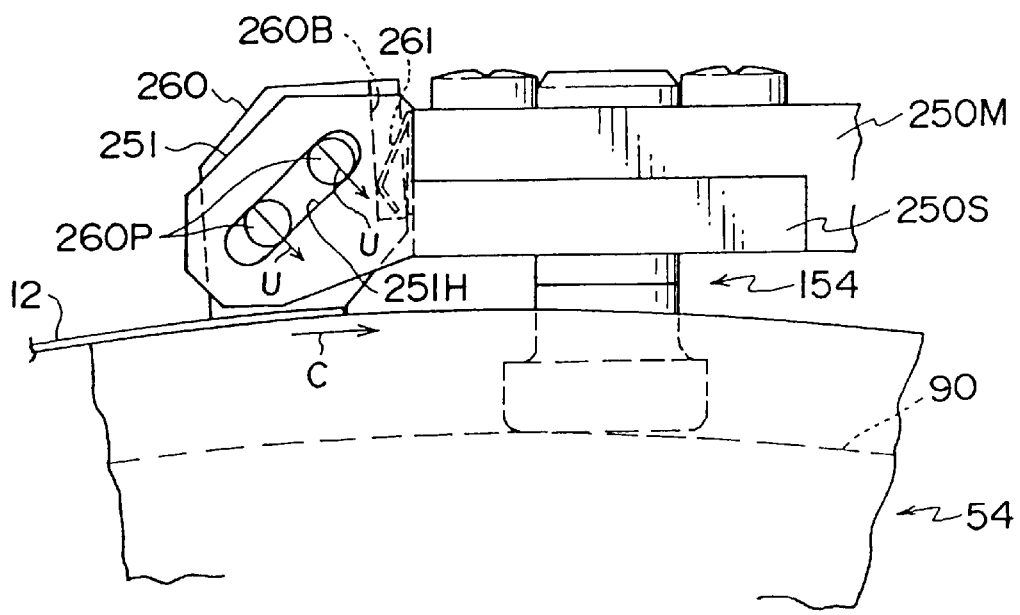
FIG. 18 is an enlarged partial side view of the plate in the state shown in FIG. 17.

As shown in FIGS. 17 and 18, when the side engaging portions 251 and the inner engaging portions 249 are brought close to the peripheral surface of the drum by a centrifugal force generated in the plate 250, the engaging projecting portions 260P are pressed in direction U by walls of the engaging holes 251H, and the clamp portions 260 move in a direction in which they apply a tension onto the printing plate 12 (direction C).

A compression plate spring 261 is provided between a right side surface of the respective clamp portion 260 shown in FIG. 15 and 17 (a side surface in which notches 260B are formed in FIGS. 12 and 13) and a side surface of the plate main body 250M. Each of the clamp portions 260 is biased by the corresponding compression plate spring 261 and is held at a most projecting position toward the printing plate 12 within a limited stroke defined by the engaging holes 251H (hereinafter, this position is called an "original position").

When the side engaging portions 251 and the inner engaging portions 249 are brought close to the peripheral surface of the drum as an effect of the centrifugal force generated in the plate 250 by high speed rotation of the rotating drum 54, the engaging projecting portions 260P are pushed in the direction U by the walls of the engaging holes 251H, and a force which slides the clamp portions 260 in the direction C from the original position is generated.

The force which slides the clamp portions 260 in the direction C from the original position is greater than the urging force of the compression plate springs 261, and therefore, the clamp portions 260 slide in the direction C from their original positions.

As the clamp portions 260 slide in the direction C from the original positions, they pull the printing plate 12 nipped between them and the rotating drum 54 in the tensioning direction. In this case, since the clamp portions 260 make surface contact with the printing plate 12, a friction coefficient therebetween is large, and thus the printing plate 12 can be tensioned with certainty.

This action occurs both at the leading and trailing edges of the printing plate 12 simultaneously, so that the middle portion of the printing plate 12 is not lifted with respect to the peripheral surface of the rotating drum 54 (the middle portion of the printing plate 12 is also held in close contact with the peripheral surface of the rotating drum 54).

As described above, in the second embodiment, the clamp portions 260 provided to the plate 250 make surface contact with the printing plate 12, so that a force for holding the printing plate 12 can be increased. Further, besides the mechanism for holding the printing plate 12 by the clamp portions 260, the clamp portions 260 are slid due to the centrifugal force working on the plate 250 as a mechanism for applying a tensile force to the printing plate 12. Therefore, the plate needs not to pivot with a large pivotal angle. Then, the structure in which an amount by which a clamp plate protrudes with respect to the drum 54 surface is maintained to be a smaller value than before may be provided according to the present invention.

<<Third Embodiment>>

A third embodiment of the present invention is described below with reference to FIGS. 19 to 25, wherein parts and portions thereof which are common with the first and second embodiments are designated by the same reference numerals. In the following description, mainly features characteristic to the third embodiment are explained, and other features which have already been explained with respect to the first and the second embodiments are not described in detail.

Figure 19:
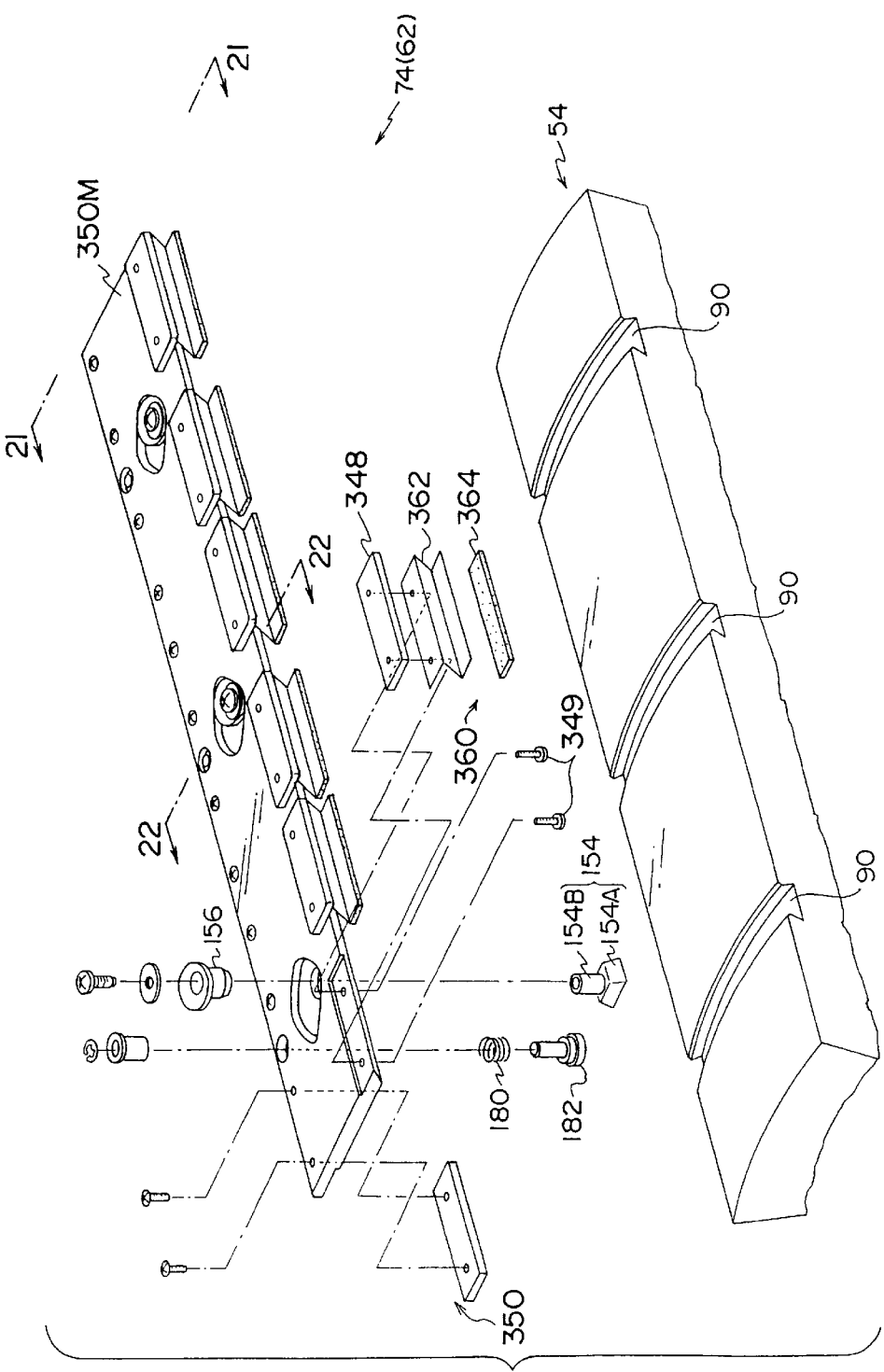
FIG. 19 is an exploded perspective view showing a main portion of a trailing edge chuck forming one of holding devices of a third embodiment of the present invention.

As shown in FIG. 19, a plate 350 includes a plate main body 350M which is pivotably supported by supporting posts 154, and a plurality of clamp portions 360 which are fixed to the plate main body 350M at one end side in a width direction thereof with an attaching plate 348 and screws 349 and nip the printing plate 12 on the peripheral surface of the drum.

The plate 350 is provided with the six clamp portions 360 arranged in a row in a longitudinal direction thereof.

Figure 20:
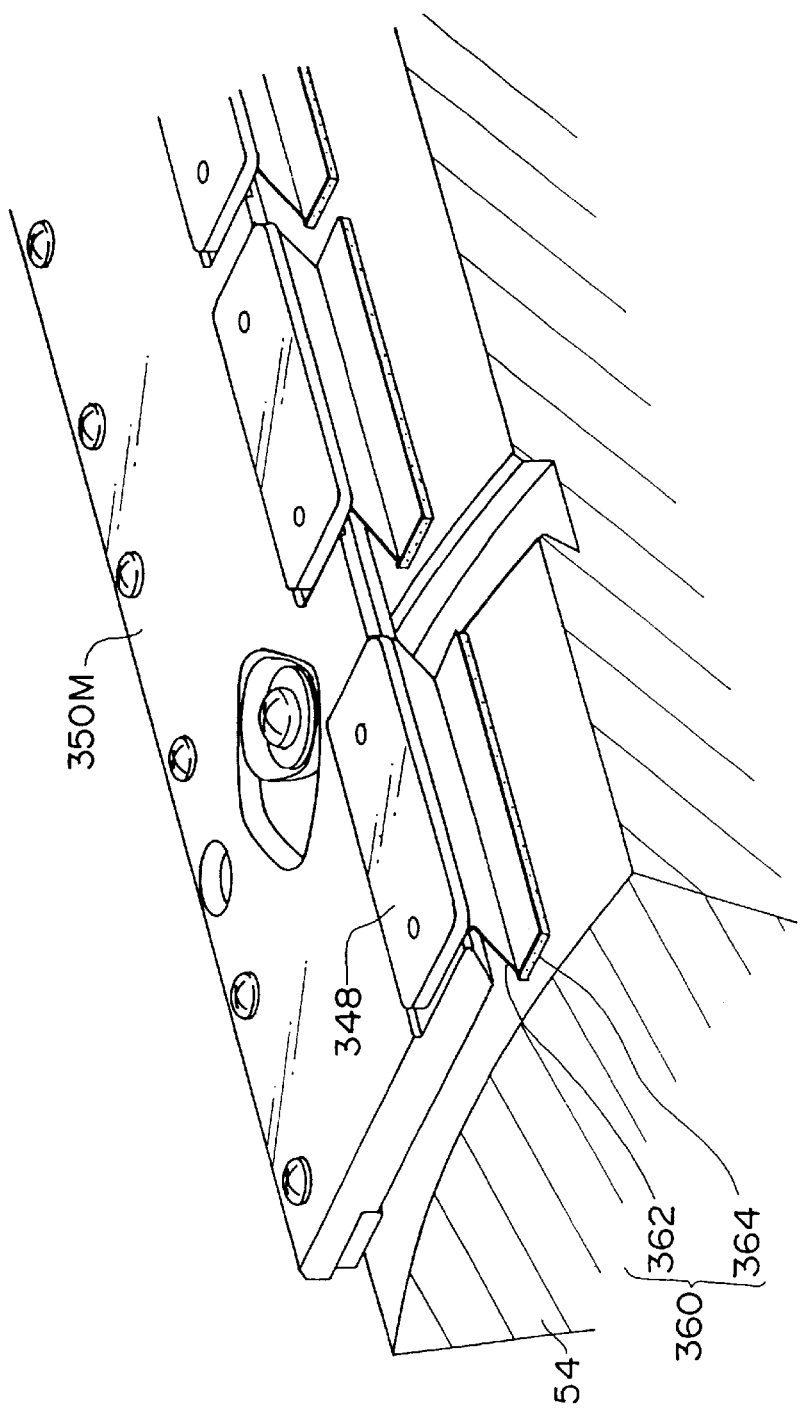
FIG. 20 is a partial perspective view showing the trailing edge chuck attached to the rotating drum.

Each of the clamp portions 360 includes a plate spring 362 having a Z-shaped sectional form and being fixed to the plate main body 350M, and a rubber plate 364 being fixed to the plate spring 362 at a surface thereof facing the rotating drum (see FIGS. 19 and 20).

Figure 23:
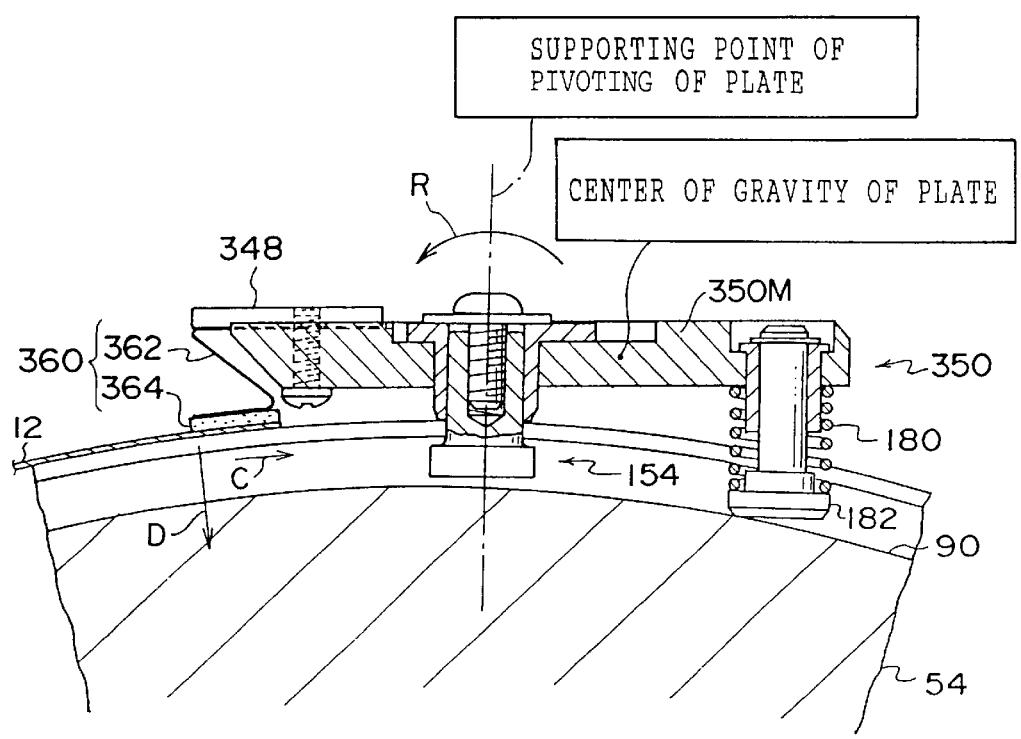
FIG. 23 is a sectional view showing the clamp portion being moved in a direction in which it tensions a printing plate by a centrifugal force generated in a plate.

As shown in FIG. 23, when the plate 350 rotates around the supporting posts 154 due to a centrifugal force generated in the plate 350, the plate springs 362 are pressed against the peripheral surface of the drum, and the rubber plates 364 move in a direction in which they apply a tension onto the printing plate 12 (direction C).

As shown in FIG. 23, when the rotating drum 54 rotates at a high speed and the centrifugal force generated in the plate 350 makes the plate 350 rotate in direction R to press the plate springs 362 against the peripheral surface of the drum, a force which slides the rubber plates 364 in the direction C from their original positions is generated. The "original position" of the rubber plate 364 herein refers to a position thereof in a state in which the plate 350 is not pressed by the loading cam 64 nor the unloading cam 70 (see FIG. 2) and the rotation of the rotating drum 54 is stopped.

As the rubber plates 364 slide from their original positions, they pull the printing plate 12 nipped between the rubber plate 364 and the rotating drum 54 in the tensioning direction. In this case, since the rubber plates 364 make surface contact with the printing plate 12, a friction coefficient therebetween is large, and therefore the printing plate 12 can be tensioned with certainty.

This action occurs both at the leading and trailing edges of the printing plate 12 simultaneously, so that the middle portion of the printing plate 12 is not lifted with respect to the peripheral surface of the rotating drum 54 (the middle portion of the printing plate 12 is also held in close contact with the peripheral surface of the rotating drum 54).

Figure 21:
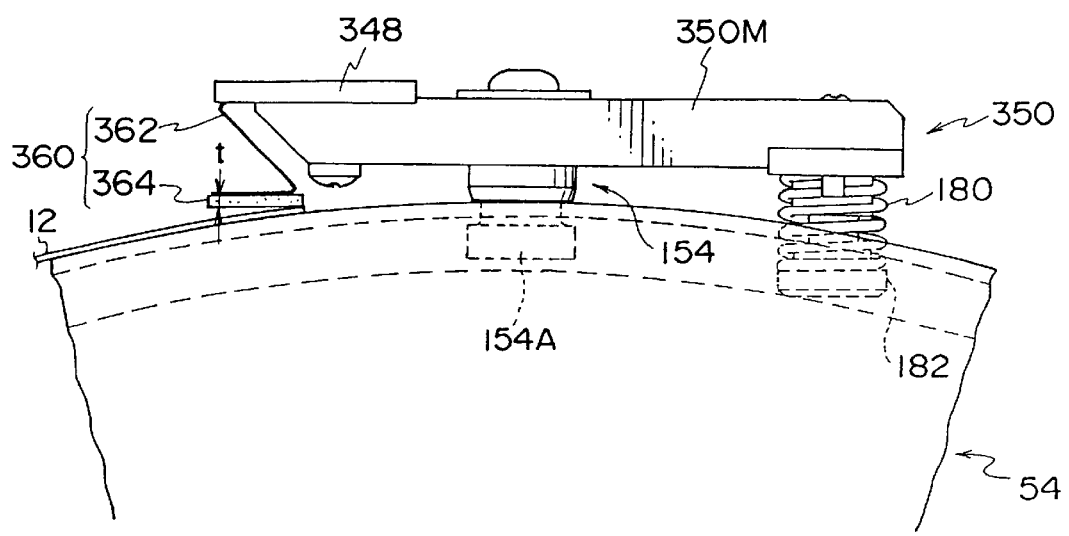
FIG. 21 is a side view taken along line 21—21 in FIG. 19 and viewed in a direction of arrows.

The rubber plates 364 are made of, for example, NBR, and respectively have a thickness t of, for example, about 0.3 mm when they are not pressed (see FIG. 21). A pressing force generated in a diameter direction D of the rotating drum 54 (see FIG. 23) by rotation of the rotating drum 54 is, for example, about 1.3 kgf/mm$^2$.

In the third embodiment, since the rubber plates 364 of the clamp portions 360 attached to the plate 350 make surface contact with the printing plate 12, a force for holding the printing plate 12 can be increased by this simple mechanism. In addition, besides the mechanism for holding the printing plate 12 by the clamp portions 360, the rubber plates 364 are slid due to the centrifugal force working on the plate 350 as a mechanism for applying a tensile force to the printing plate 12. Therefore, the plate needs not to pivot with a large pivotal angle. Then, the structure in which an amount by which a clamp plate protrudes with respect to the drum 54 surface is maintained to be a smaller value than before may be provided according to the present invention.

FIGS. 24 and 25 show a variation wherein clamp portions are formed of block members 390. The block member 390 is an elastic member having a parallelogram sectional form, which is slanted from an upper end to a lower end thereof in the direction C in which the printing plate 12 is tensioned.

The block members 390 are fixed to each of the plate main bodies 350M forming the leading edge chuck and the trailing edge chuck via attaching plates 392 respectively. That is, as shown in FIG. 24, the upper end of the respective block member 390 is fixed to the attaching plate 392, and a lower end surface 390U of the respective block member 390 nips the printing plate 12 on the peripheral surface of the drum.

As shown in FIG. 25, when the centrifugal force generated by rotation of the rotating drum 54 works on the plate 394, the plate 394 rotates in direction R to press the block members 390 against the peripheral surface of the drum. As a result, the block members 390 elastically deform and the lower end surfaces 390U of the block members 390 move in the tensioning direction (direction C) in a state in which they make surface contact with the printing plate 12.

As described above, when the rotating drum 54 rotates, the printing plate 12 is pressed against the peripheral surface of the drum and pulled in the tensioning direction.

This action occurs both at the leading and trailing edges of the printing plate 12 simultaneously, so that the middle portion of the printing plate 12 is not lifted with respect to the peripheral surface of the rotating drum 54 (the middle portion of the printing plate 12 is also held in close contact with the peripheral surface of the rotating drum 54).

Dimensions of the attaching plate 392 is decided so that a projecting distance thereof from the plate main body 350M is substantially the same as that of the block member 390, or slightly larger than that of the block member 390. Thus, the block member 390 can be fixed to the attaching plate 392 with a sufficient fixing force.

<<Fourth Embodiment>>

A fourth embodiment of the present invention is described below with reference to FIGS. 26 to 30, wherein parts and portions thereof which are common with the first to third embodiments are designated by the same reference numerals. In the following description, mainly features characteristic to the fourth embodiment are explained, and other features which have already been explained with respect to the first to the third embodiments are not described in detail.

Figure 26:
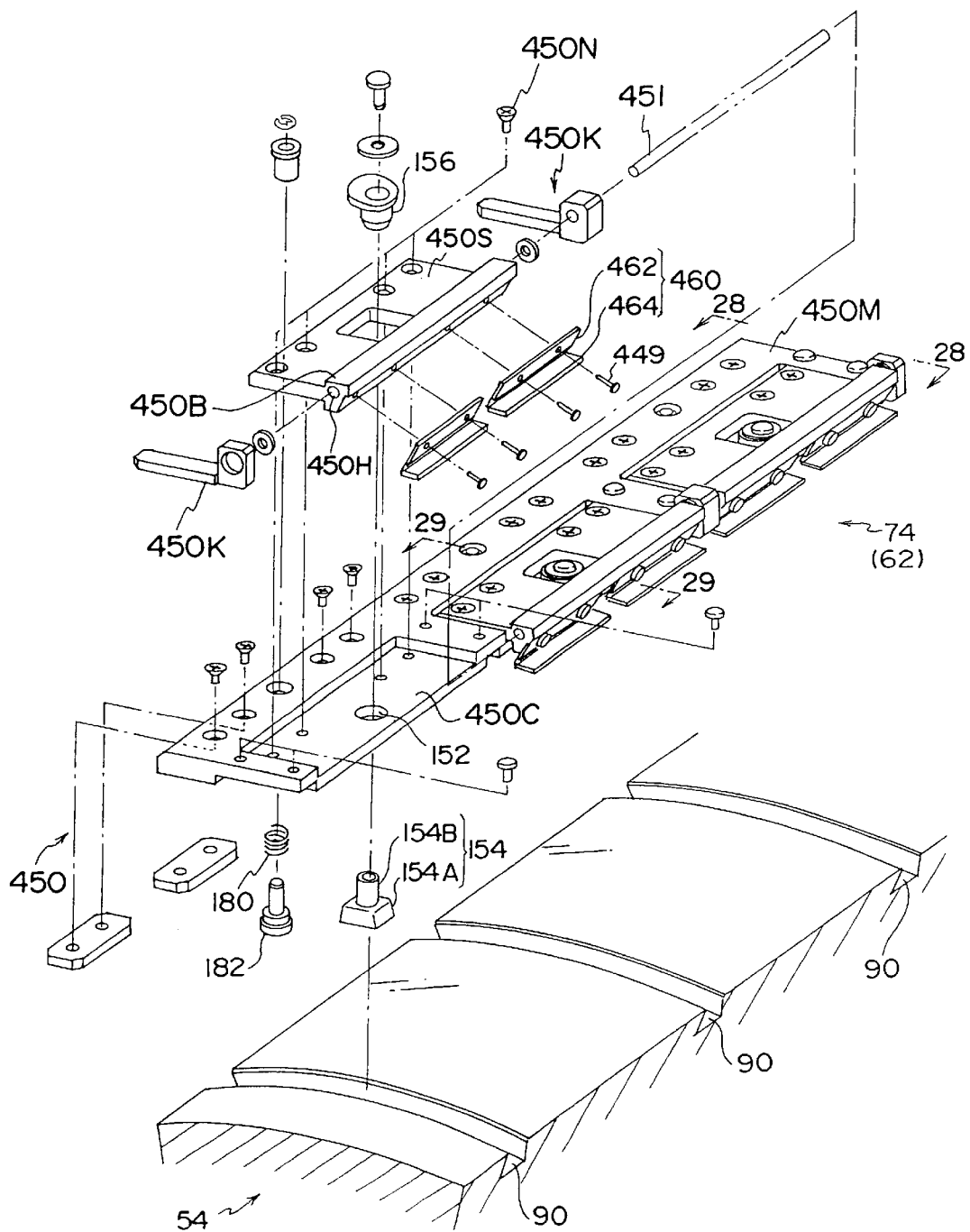
FIG. 26 is an exploded perspective view partially showing a trailing edge chuck forming one of holding devices of a fourth embodiment of the present invention.
Figure 27:
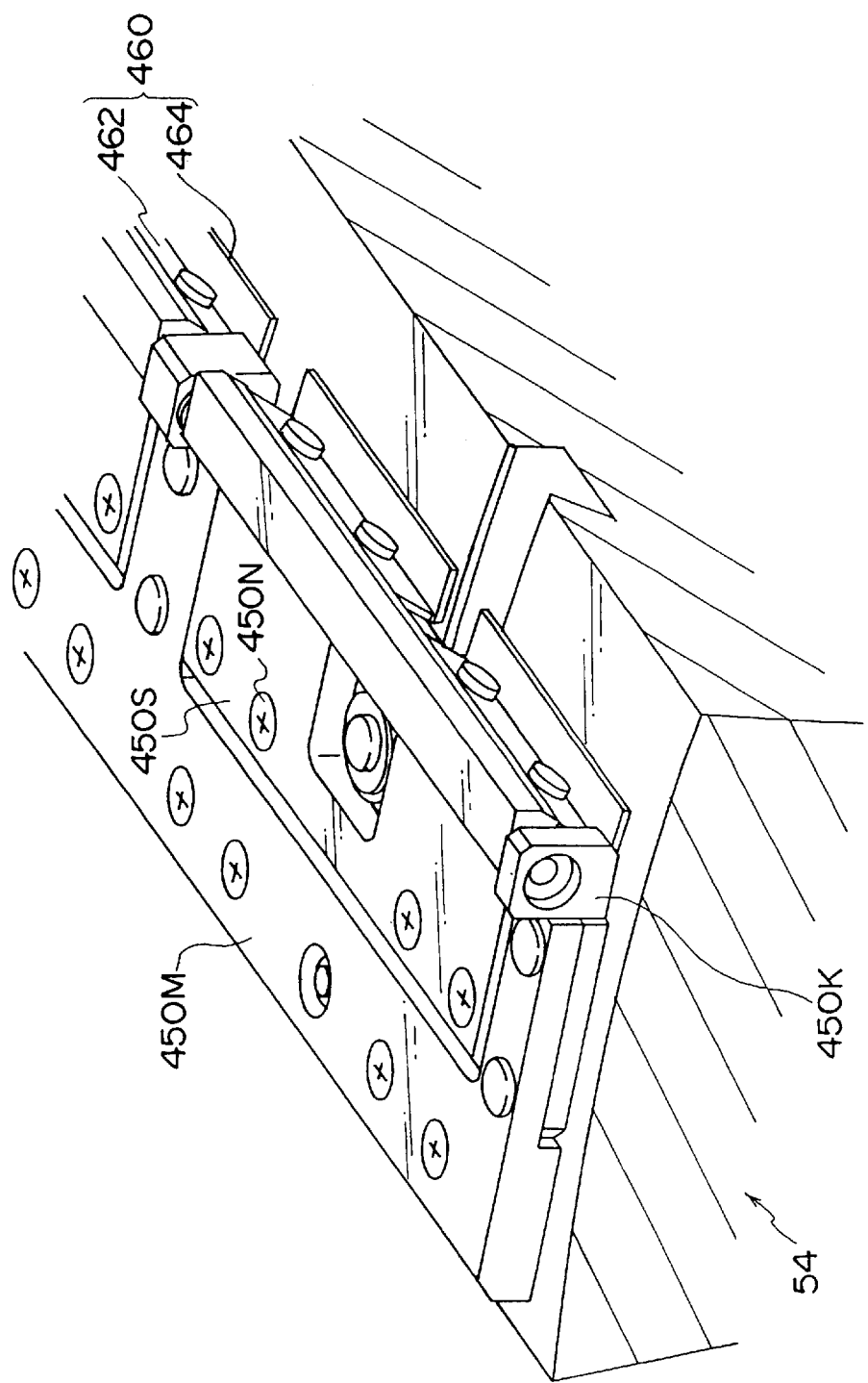
FIG. 27 is a partial perspective view showing the trailing edge chuck attached to the rotating drum.
Figure 29:
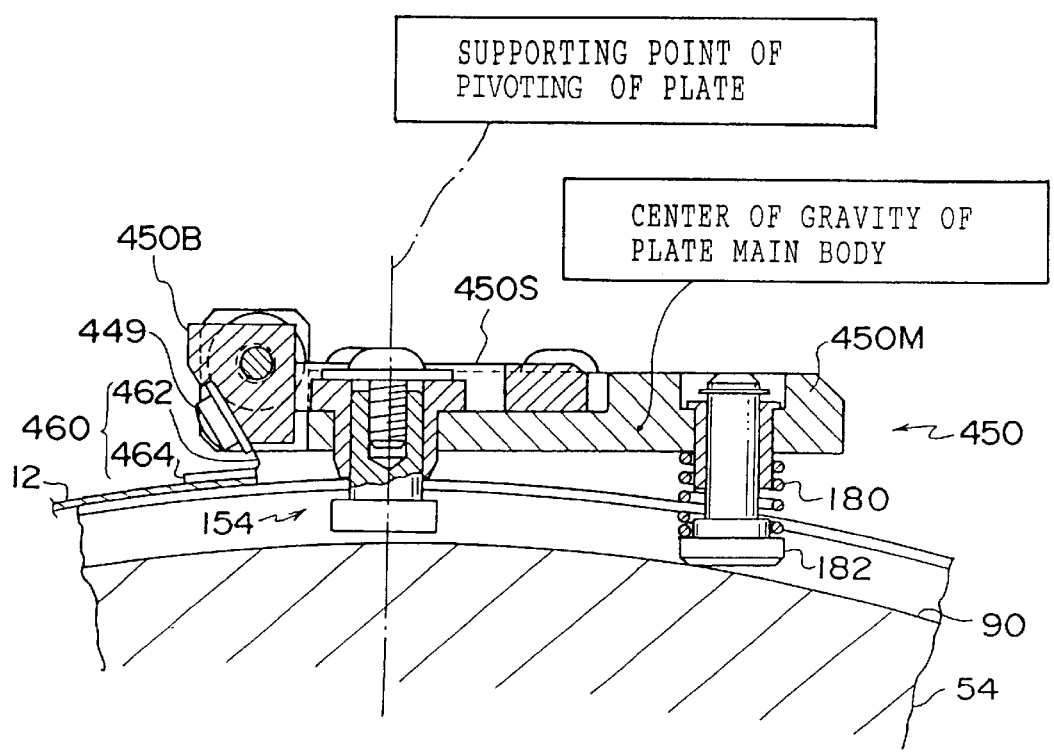
FIG. 29 is a sectional view taken along line 29—29 in FIG. 26 and viewed in a direction of arrows.

As shown in FIG. 26, a plate 450 includes a plate main body 450M which is pivotably supported by supporting posts 154, sub-plates 450S being pivotable with respect to the plate main body 450M, and holding portions 450K fixed to the plate main body 450M for pivotably holding the sub-plates 450S.

Each of the sub-plate 450S is provided with a block portion 450B at one end side in a width direction thereof, and a through hole 450H, through which a pivot shaft 451 is pierced, is formed in the block portion 450B. A plurality of clamp portions 460 for nipping the printing plate 12 on the peripheral surface of the drum are fixed to the block portion 450B with screws 449.

As shown in FIG. 26, the plate 450 is provided with three sub-plates 450S respectively provided with two clamp portions 460, that is, the plate 450 is provided with the six clamp portions 460 arranged in a row in a longitudinal direction thereof.

Each of the clamp portions 460 includes a plate spring 462 having a substantially L-shaped cross section fixed to the block portion 450B. The plate spring 462 includes a lower surface 462U (see FIG. 27) facing the peripheral surface of the rotating drum 54, and the clamp portion 460 further includes a rubber plate 464 fixed to the lower surface 462 (see FIG. 28).

Figure 30:
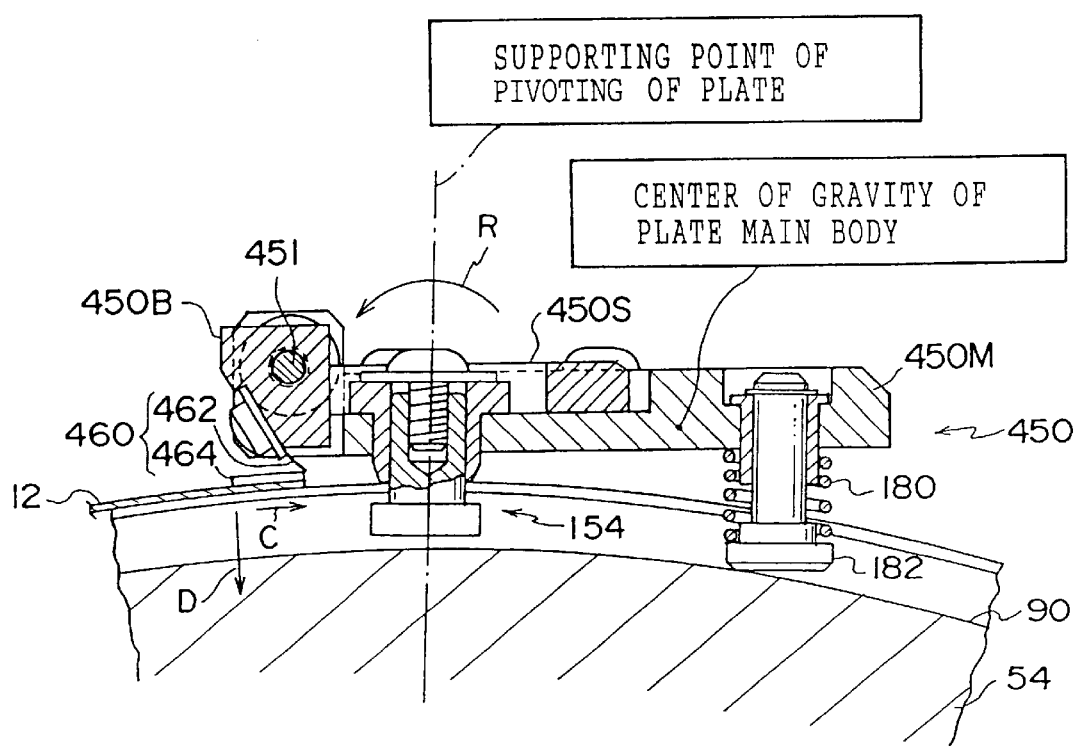
FIG. 30 is a sectional view showing the clamp portion being moved in a direction in which it tensions a printing plate by a centrifugal force generated in a plate.

As shown in FIG. 30, when the plate main body 450M rotates around the supporting posts 154 due to a centrifugal force generated in the plate 450, the plate springs 462 are pressed against the peripheral surface of the drum, and thus the printing plate 12 is pressed against the peripheral surface of the drum by the rubber plates 464. Further, the sub-plates 450S pivot around the pivot shaft 451 due to the centrifugal force working on the sub-plates 450S, and thus the rubber plates 464 move in a direction in which they apply a tension to the printing plate 12 (direction C).

In order to accommodate the sub-plates 450S in a accommodating recesses 450C of the plate main body 450M when rotation of the rotating drum 54 is stopped, each of the sub-plates 450S is provided with accommodation screws 450N which receive slight tensile forces from tension coil springs (not shown) or the like.

As shown in FIG. 30, when the rotating drum 54 rotates at a high speed and the centrifugal force generated in the plate 450 makes the plate 450 rotate in direction R to press the plate springs 462 against the peripheral surface of the drum, the block portions 450B press the plate springs 462 and the rubber plates 464 press the printing plate 12 against the peripheral surface of the drum. At the same time, the sub-plates 450S pivot around the pivot shaft 451 due to the centrifugal force working on the sub-plates 450S, and a force to slide the rubber plates 464 further in the direction C from their original positions is generated. The "original position" of the rubber plate 464 herein refers to a position thereof in a state in which the plate 450 is not pressed by the loading cam 64 nor the unloading cam 70 (see FIG. 2) and the rotation of the rotating drum 54 is stopped.

As the rubber plates 464 slide from the original positions, they pull the printing plate 12 nipped between the rubber plates 464 and the rotating drum 54 in the tensioning direction. In this case, since the rubber plates 464 make surface contact with the printing plate 12, a friction coefficient therebetween is large, and therefore the printing plate 12 can be tensioned with certainty.

This action occurs both at the leading and trailing edges of the printing plate 12 simultaneously, so that the middle portion of the printing plate 12 is not lifted with respect to the peripheral surface of the rotating drum 54 (the middle portion of the printing plate 12 is also held in close contact with the peripheral surface of the rotating drum 54).

The rubber plates 464 are made of, for example, NBR, and respectively have a thickness t of, for example, about 0.3 mm when they are not pressed (see FIG. 28). A pressing force generated in a diameter direction D of the rotating drum 54 (see FIG. 30) by rotation of the rotating drum 54 is, for example, about 1.3 kgf/mm$^2$.

In the fourth embodiment, since the rubber plates 464 of the clamp portions 460 attached to the plate 450 make surface contact with the printing plate 12, a force for holding the printing plate 12 can be increased.

In addition to the mechanism for holding and pressing the printing plate 12 onto the drum peripheral surface by the clamp portions 460, there is provided a structure in which the rubber plates 464 are slid due to the centrifugal force working on the sub-plate 450S as a mechanism for applying a tensile force to the printing plate 12. A magnitude of the force in the sliding direction (the direction in which the printing plate 12 is tensioned) can be adjusted by adjusting weights, shapes, and the like of the sub-plates 450S, separately from a force in a direction in which the printing plate 12 is pressed (diameter direction D of the rotating drum 54 shown in FIG. 30). Therefore, the force for pressing and holding the printing plate 12 and the force for tensioning the printing plate 12 can be respectively optimized. Further, the plate needs not to pivot with a large pivotal angle. Then, the structure in which an amount by which a clamp plate protrudes with respect to the drum 54 surface is maintained to be a smaller value than before may be provided according to the present invention.

<< Fifth Embodiment >>

A fifth embodiment of the present invention is described below with reference to FIGS. 31 to 35, wherein parts and portions thereof which are common with the first to fourth embodiments are designated by the same reference numerals. In the following description, mainly features characteristic to the fifth embodiment are explained, and other features which have already been explained with respect to the first to the fourth embodiments are not described in detail.

Figure 31:
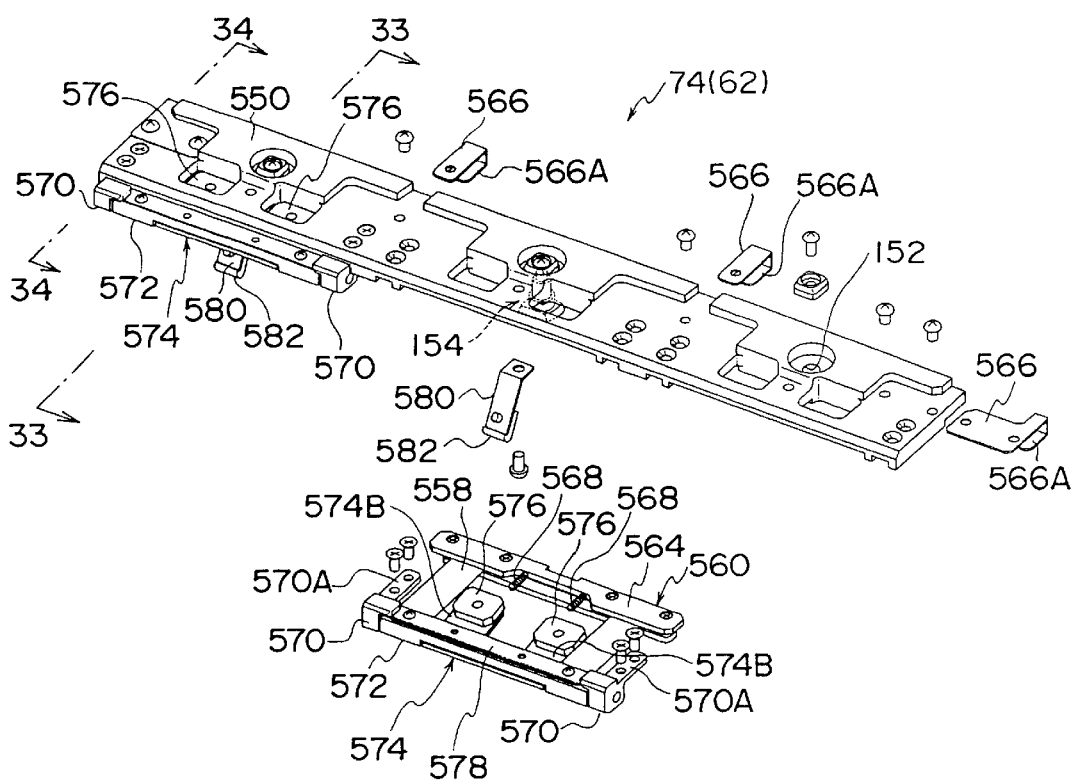
FIG. 31 is an exploded perspective view showing a main portion of a trailing edge chuck forming one of holding devices of a fifth embodiment of the present invention.
Figure 32:
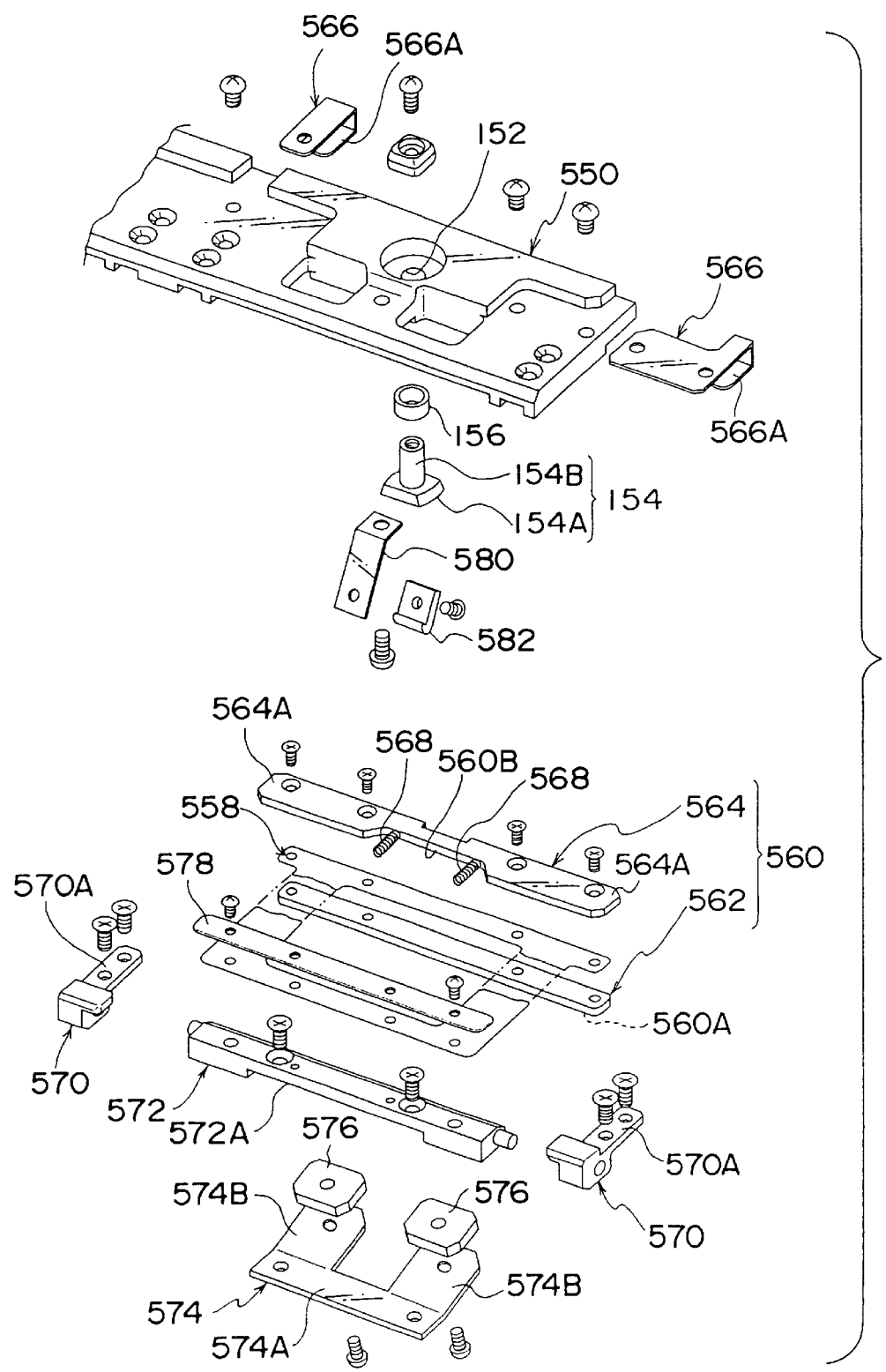
FIG. 32 is an enlarged exploded perspective partial view of FIG. 31.

As shown in FIGS. 31 and 32, each of plates 550 forming main portions of the leading edge chuck 62 and the trailing edge chuck 74 includes clamp portions 560 at one end side in a width direction thereof. Each of the clamp portions 560 includes a flat bar-like nipping member 562 having a flat surface (nipping surface) which at least faces the rotating drum 54, and a flat bar-like assisting member 564 for, together with the nipping member 562, nipping and fixing a metal plate 558 (described later).

Figure 35:
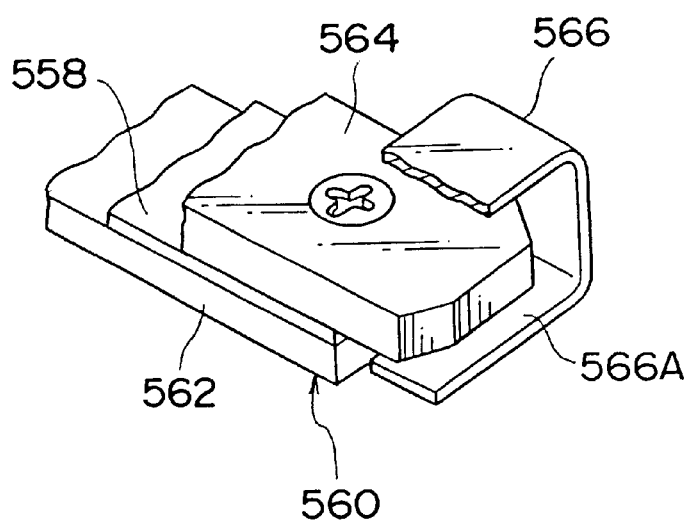
FIG. 35 is a perspective view showing a structure of an end portion of a clamp portion.

The plate 550 is provided with three clamp portions 560 arranged in a row in a longitudinal direction thereof, and the clamp portions 560 can move in a thickness direction of the plate 550 (hereinafter referred to as "vertical direction"). As shown in FIG. 35, the assisting member 564 is formed longer than the nipping member 562 at both ends in a longitudinal direction of the respective clamp portion 560 (an axial direction of the rotating drum 54), thereby forming tongue portions 564A. The tongue portions 564A are supported by hook portions 566A of supporting plates 566 attached at opposite end portions in the longitudinal direction and a central portion of the plate 550. The respective hook portion 566A is bent in a substantial U shape, and the tongue portions 564A are accommodated in it. Thus, movement of the clamp portions 560 in the vertical direction is limited by upper and lower walls of the hook portions 566A, and the clamp portions 560 are prevented from coming off by the lower walls of the hook portions 566A.

The clamp portions 560 are guided along guide grooves (not shown) formed in the plate 550 and can move a predetermined distance in the width direction of the plate 550 (hereinafter referred to as a "sliding direction").

Figure 33:
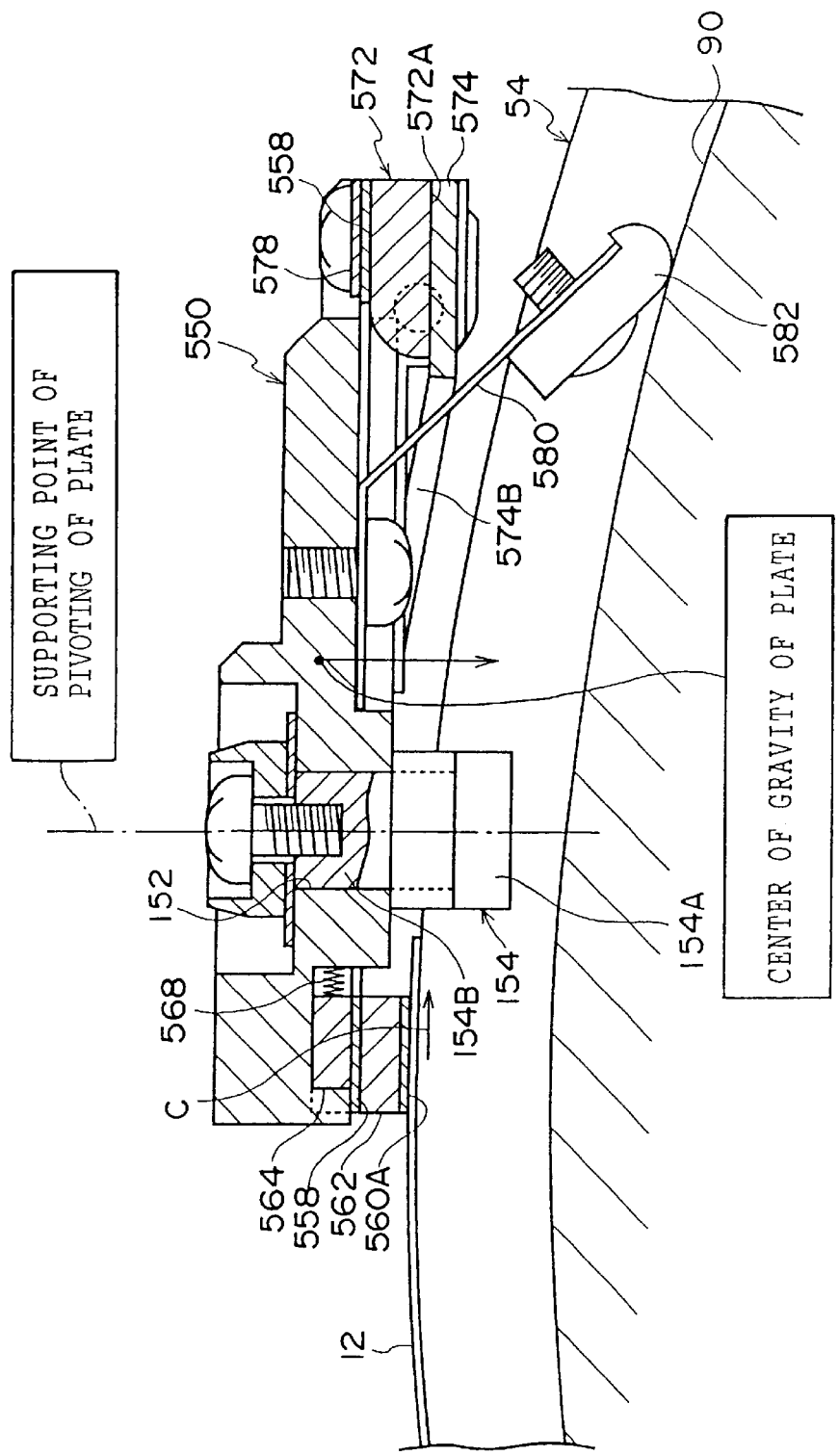
FIG. 33 is a sectional view taken along line 33—33 in FIG. 31 and viewed in a direction of arrows.
Figure 34:
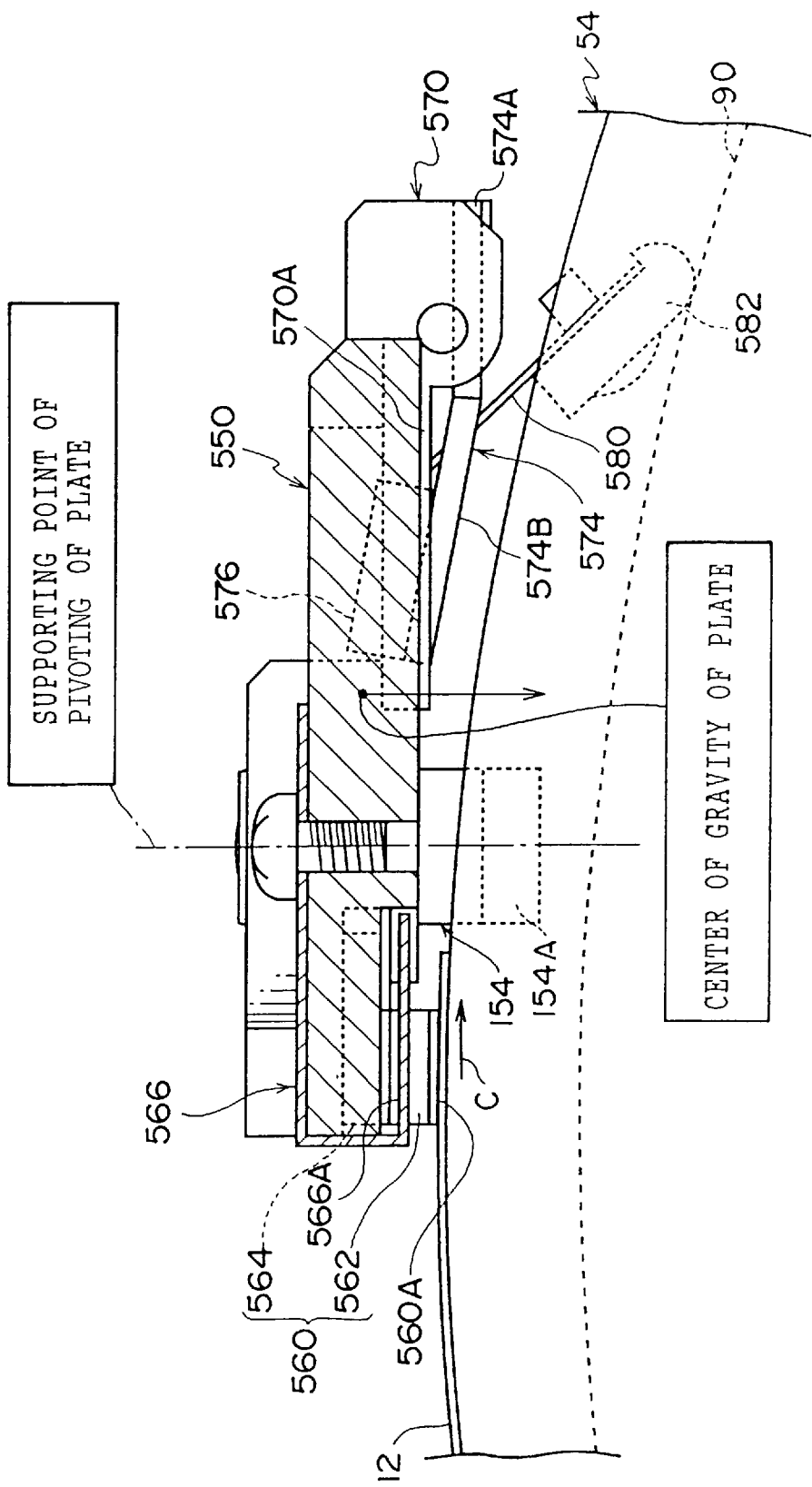
FIG. 34 is a sectional view taken along line 34—34 in FIG. 31 and viewed in a direction of arrows.

One end portions of compression coil springs 568 are abutted to a right side surface of the respective clamp portion 560 shown in FIGS. 33 and 34 (a side surface in which a notch 560B is formed). The other end portions of the compression coil springs 568 are inserted and held in circular depressions (not shown) provided in an inner wall of the plate 550. Each of the clamp portions 560 is biased by the corresponding compression coil spring 568 and is held at a most projecting and sliding position toward the printing plate 12 within a limited stroke defined by the above-described, not-illustrated, guide grooves (hereinafter, this position is called an "original position").

Further, as described above, the thin and flexible metal plate 558 is nipped between the nipping member 562 and the assisting member 564 forming the clamp portion 560.

A shape of the metal plate 558, when viewed from top, is substantially a rectangular frame shape, and two sides thereof which are perpendicular to the nipped side are extended to a right end of the plate 550 shown in FIGS. 33 and 34. There is no functional reason for the metal plate 558 having the frame shape, and the reason is to avoid interference with other parts. Therefore, if there is no interference, the metal plate 558 may be a flat plate.

A stick-like rotating member 572 having a substantially square sectional form is attached at the right end portion of the plate 550 shown in FIGS. 33 and 34 via a support 570. The rotating member 572 is axially supported by the rectangular block-shaped support 570 having a substantially square cross section, so as to be rotatable with respect to the support 570. The support 570 is provided with an integrally formed attaching flange 570A, and is fixed to the plate 550.

A flap 574 is attached to the rotating member 572 so that one end portion of the flap 574 is closely accommodated in a notch 572A formed at a lower surface of the rotating member 572. The flap 574 is provided with a pair of wing portions 574B which extend from a base portion 574A accommodated in the notch 572A toward the clamp portion 560, and weights 576 are fixed at tip portions of the wing portions 574B. In this structure, when the trailing edge chuck 74 is attached to the rotating drum 54 and is rotated, a centrifugal force is applied to the flap 574, and the centrifugal force effectively works on the rotating member 572 with the aid of the weights 576 to rotate the rotating member 572.

The other end portion of the metal plate 558 is disposed at an upper surface of the rotating member 572, and is nipped and fixed by the upper surface and a flat bar-like fixing member 578.

Therefore, the rotation of the rotating member 572 applies a tensile force to the metal plate 558. That is, the rotational force of the rotating member 572 is converted into the tensile force by the metal plate 550 flexing and winding around the metal plate 558. Since a moving force off the metal plate 550 is very small, the movement of the metal plate 550 appears to be substantially translational.

The tensile force of the metal plate 558 can move the clamp portion 560 rightward (in direction C) in FIGS. 33 and 34 from the original point against the urging force of the compression coil spring 568.

Further, one end portion of a plate spring 580 which is bent in substantial L shape is fixed at a lower surface at a right end portion of the plate 550 shown in FIGS. 33 and 34 (within the frame of the metal plate 558). Each plate spring 580 is bent toward the rotating drum 54. A weight 582 is attached to the other end portion of each plate spring 580.

When being attached to the rotating drum 54, the plate springs 580 and the weights 582 are accommodated in the grooves 90 provided to the rotating drum 54. Namely when the trailing edge chuck 74 is brought close to the rotating drum 54, first, the weights 582 abut on the bottom surfaces of the groove 90, and as the trailing edge chuck 74 is brought closer to the rotating drum 54, the plate springs 580 resiliently deform. An urging force generated by this resilient deformation pivots the plate 550 around the supporting posts 154. Thus a pressing force by the clamp portions 560 is formed. When the plate springs resiliently deform, the weights 582 slide on the bottom surfaces of the grooves 90. Since the sliding surface of the respective weights 582 has a circular arc-shaped portion and has a relatively small friction coefficient, the weights 582 can slide smoothly.

When the edge of the printing plate 12 enters between the rotating drum 54 and the plates 550 of the leading edge chuck 62, inhibition of the rotation of the plates 550 by the cam 64 is cancelled, and the plates 550 pivot around the supporting posts 154 due to the urging force applied from the plate springs 580. By this pivoting movement, the clamp portions 560 move toward the peripheral surface of the rotating drum 54, and thus, the printing plate 12 can be nipped between the clamp portions 560 and the peripheral surface of the rotating drum 54.

The trailing edge chuck 74 is attached to the rotating drum 54 when the printing plate 12 has reached a predetermined position. Along with the attaching movement, the urging force from the plate springs 580 works (the weights 582 at the tips of the plate springs 580 reach fastest the bottom surfaces of the grooves 90) to gradually pivot the plates 550 around the supporting posts 154, thereby nipping the aligned printing plate 12 between the plates 550 and the peripheral surface of the rotating drum 54.

As the printing plate 12 is held by the leading edge chuck 62 and the trailing edge chuck 74, the rotating drum 54 starts high speed rotation for recording an image.

By a centrifugal force generated by this rotation, the plates 550 pivot around the supporting posts 154. Since the center of gravity of the respective plate 550 is positioned at a side opposite to the clamp portion 560 with respect to the supporting post 154, a direction of the pivot of the plates 550 caused by the centrifugal force is the same as that of the pivot thereof caused by the urging force applied from the plate springs 580. Thus, the force for nipping the leading and trailing edges of the printing plate 12 can be increased during the high speed rotation of the rotating drum 54, i.e., during image recording.

The centrifugal force generated by the high-speed rotation of the rotating drum 54 also works on the flaps 574. Since the weights 576 are attached to the wing portions 574B of the flaps 574, torque of axial rotation of the wing portions 574B due to the centrifugal force is increased, and the rotating members 572 are rotated by this force. Since the flaps 574 are attached to the lower surface side of the respective rotating members 572, the rotating members 572 rotate clockwise in FIGS. 33 and 34. When the rotating members 572 rotate clockwise in FIGS. 33 and 34, the metal plates 558 attached to the upper end portions of the rotating members 572 move so as to wind around the rotating members 572. Thus, a force in the tensioning direction is applied to the metal plates 558.

This movement of the metal plates 558 in the tensioning direction slides the clamp portions 560 from the original position against the urging force of the compression coil springs 568.

As the clamp portions 560 slide from the original position, they pull the printing plate 12 nipped between them and the rotating drum 54 in the tensioning direction. In this case, since the clamp portions 560 make surface contact with the printing plate 12, a friction coefficient therebetween is large, and thus the printing plate 12 can be tensioned with certainty.

This action occurs both at the leading and trailing edges of the printing plate 12 simultaneously, so that the middle portion of the printing plate 12 is not lifted with respect to the peripheral surface of the rotating drum 54 (the middle portion of the printing plate 12 is also held in close contact with the peripheral surface of the rotating drum 54).

In the fifth embodiment, the clamp portions 560 provided to the plate 550 make surface contact with the printing plate 12, so that a force for holding the printing plate 12 can be increased. Further, besides a mechanism for holding the printing plate 12 by the clamp portions 260, the clamp portions 560 are slid by flapping of the flaps due to the centrifugal force as a mechanism for applying a tensile force to the printing plate 12. Therefore, the plate 550 can clamp/unclamp the printing plate with a smaller pivoting angle. Then, a projecting amount by which the plate 150 projects from the rotating drum surface can be reduced.

In addition, since the mechanism for nipping (holding) the printing plate 12 between the plates 550 (clamp portions 560) and the rotating drum 54 and the mechanism for tensioning the printing plate 12 by sliding of the clamp portions 560 can be separately designed, an optimal design can be facilitated.

What is claimed is:

1. A device for pressing and tensioning a sheet member onto a rotating drum around which the sheet member is held, the device comprising:

a support structure including a support which is mounted at a predetermined position on a peripheral surface of the drum;

a plate having two end portions, between which the plate is pivotably connected to the drum through the support structure;

a clamp element connected to one of the end portions of the plate so as to be movable with respect to the plate, the sheet member being disposed between the clamp element and the peripheral surface;

a resilient element applying a force to the other end portion of the plate, causes the one end portion of the plate to pivot toward the peripheral surface and press the clamp element against the sheet member, thereby resulting in a pressing force against the sheet member; and a tensioning element which, when the drum rotates, applies a tensioning force to the sheet member via the clamp element due to centrifugal force.

2. The device of claim 1, wherein the plate has a center of gravity located between the end portions of the plate, the support supports the plate at a location nearer to the one end portion of the plate with respect to the center of gravity, and centrifugal force acting on the plate when the drum rotates causes the pressing force at the sheet member to increase.

3. The device of claim 1, wherein the pressing force comprises a first component force, which is in a direction opposite to the direction of the centrifugal force, and a second component force perpendicular to the first component force, and the first component force acts to press the sheet member against the drum surface and the second component force acts to draw the sheet member along a peripheral direction of the drum.

4. The device of claim 1, wherein the clamp element moves from an original position to another position when pressed against the sheet member, the device further comprising a returning element which urges the clamp element to remain at the original position.

5. The device of claim 1, wherein the drum includes a groove formed along the peripheral surface of the drum, the groove having a bottom portion and an opening portion, and having a cross-section such that the opening portion has a width smaller than the bottom portion, and wherein the support is attachable to and detachable from the drum via the groove.

6. The device of claim 1, wherein the drum includes a groove formed along the peripheral surface of the drum, the groove having a bottom portion and an opening portion, and having a cross-section such that the opening portion has a width smaller than the bottom portion, and wherein the support is mountable at a plurality of positions along the groove length, thereby permitting the sheet member to be fixed to the drum at a desired position.

7. The device of claim 1, wherein the tensioning element applies, when the drum rotates, a tensioning force to the clamp element via the plate due to centrifugal force.

8. The device of claim 1, wherein the clamp element is pivotably connected to one of the end portions of the plate.

9. The device of claim 8, wherein the plate has a center of gravity located between the end portions of the plate, the support supports the plate at a location nearer to the one end portion of the plate with respect to the center of gravity, and centrifugal force acting on the plate when the drum rotates causes the pressing force at the sheet member to increase.

10. The device of claim 8, wherein the clamp element includes an eccentric cam surface which presses the sheet member.

11. The device of claim 10, wherein the pressing force comprises a first component force, which is in a direction opposite to the direction of the centrifugal force, and a second component force perpendicular to the first component force.

12. The device of claim 11, wherein the first component force acts to press the sheet member against the drum surface, and the second component force acts to draw the sheet member along a peripheral direction of the drum.

13. The device of claim 8, wherein the clamp element has an axis of rotation substantially parallel to an axis of rotation of the drum.

14. The device of claim 8, wherein the clamp element rotates from an original angular position when pressed against the sheet member, the device further comprising a returning element which urges the clamp element to remain at the original angular position.

15. The device of claim 8, wherein the drum includes a groove formed along the peripheral surface of the drum, the groove having a bottom portion and an opening portion, and having a cross-section such that the opening portion has a width smaller than the bottom portion, and wherein the support is attachable to and detachable from the drum via the groove.

16. The device of claim 8, wherein the drum includes a groove formed along the peripheral surface of the drum, the groove having a bottom portion and an opening portion, and having a cross-section such that the opening portion has a width smaller than the bottom portion, and wherein the support is mountable at a plurality of positions along the groove length, thereby permitting the sheet member to be fixed to the drum at a desired position.

17. The device of claim 1, wherein at least one of the clamp element and the plate comprises an engaging structure connecting the clamp element and the plate to one another.

18. The device of claim 17, wherein the pressing force comprises a first component force, which is in a direction opposite to the direction of the centrifugal force, and a second component force perpendicular to the first component force, and the first component force acts to press the sheet member against the drum surface and the second component force acts to draw the sheet member along a peripheral direction of the drum.

19. The device of claim 1, wherein the clamp element includes a resiliently deformable portion.

20. The device of claim 19, wherein the plate has a center of gravity located between the end portions of the plate, the support supports the plate at a location nearer to the one end portion of the plate with respect to the center of gravity, and centrifugal force acting on the plate when the drum rotates causes the pressing force at the sheet member to increase.

21. The device of claim 19, wherein the resiliently deformable portion of the clamp element inclines toward the other end portion of the plate with respect to a direction of the pressing force.

22. The device of claim 21, wherein the pressing force comprises a first component force, which is in a direction opposite to the direction of the centrifugal force, and a second component force perpendicular to the first component force, and the first component force acts to press the sheet member against the drum surface and the second component force acts to draw the sheet member along a peripheral direction of the drum.

23. The device of claim 19, wherein the drum includes a groove formed along the peripheral surface of the drum, the groove having a bottom portion and an opening portion, and having a cross-section such that the opening portion has a width smaller than the bottom portion, and wherein the support is attachable to and detachable from the drum via the groove.

24. The device of claim 19, wherein the drum includes a groove formed along the peripheral surface of the drum, the groove having a bottom portion and an opening portion, and having a cross-section such that the opening portion has a width smaller than the bottom portion, and wherein the support is mountable at a plurality of positions along the groove length, thereby permitting the sheet member to be fixed to the drum at a desired position.

25. The device of claim 1, further comprising a second plate pivotably connected to one of the end portions of the first plate, and
wherein the clamp element is attached to the second plate and includes a resiliently deformable portion.

26. The device of claim 25, wherein the first plate has a center of gravity located between the end portions of the first plate, the support supports the first plate at a location nearer to the one end portion of the first plate with respect to the center of gravity, and centrifugal force acting on the first plate when the drum rotates causes the pressing force at the sheet member to increase.

27. The device of claim 25, wherein the second plate has two end portions with a center of gravity located therebetween, the first plate supports the second plate at a location nearer to the clamp element with respect to the center of gravity, and centrifugal force acting on the second plate when the drum rotates causes the force for drawing the sheet member to increase.

28. The device of claim 25, wherein the resiliently deformable portion of the clamp element inclines toward the other end portion of the first plate with respect to a direction of the pressing force.

29. The device of claim 25, wherein the pressing force comprises a first component force, which is in a direction opposite to the direction of the centrifugal force, and a second component force perpendicular to the first component force, and the first component force acts to press the sheet member against the drum surface and the second component force acts to draw the sheet member along a peripheral direction of the drum.

30. The device of claim 25, wherein the second plate has an axis of rotation substantially parallel to an axis of rotation of the drum.

31. The device of claim 25, wherein the drum includes a groove formed along the peripheral surface of the drum, the groove having a bottom portion and an opening portion, and having a cross-section such that the opening portion has a width smaller than the bottom portion, and wherein the support is attachable to and detachable from the drum via the groove.

32. The device of claim 25, wherein the drum includes a groove formed along the peripheral surface of the drum, the groove having a bottom portion and an opening portion, and having a cross-section such that the opening portion has a width smaller than the bottom portion, and wherein the support is mountable at a plurality of positions along the groove length, thereby permitting the sheet member to be fixed to the drum at a desired position.

* * * * *